US009963546B2

(12) United States Patent
Bhagwagar et al.

(10) Patent No.: US 9,963,546 B2
(45) Date of Patent: May 8, 2018

(54) FLUORINATED COMPOUND, CURABLE COMPOSITION COMPRISING SAME, AND CURED PRODUCT

(71) Applicant: Dow Corning Corporation, Midland, MI (US)

(72) Inventors: Dorab E Bhagwagar, Saginaw, MI (US); Jing Jiang, Iowa City, IA (US); Don L Kleyer, Hemlock, MI (US); William J Schulz, Jr., Peoria, AZ (US)

(73) Assignee: DOW CORNING CORPORATION, Midland, MI (US)

( * ) Notice: Subject to any disclaimer, the term of this patent is extended or adjusted under 35 U.S.C. 154(b) by 0 days. days.

(21) Appl. No.: 15/115,321

(22) PCT Filed: Mar. 10, 2015

(86) PCT No.: PCT/US2015/019563
§ 371 (c)(1),
(2) Date: Jul. 29, 2016

(87) PCT Pub. No.: WO2015/142560
PCT Pub. Date: Sep. 24, 2015

(65) Prior Publication Data
US 2017/0009014 A1    Jan. 12, 2017

Related U.S. Application Data

(60) Provisional application No. 61/954,096, filed on Mar. 17, 2014, provisional application No. 62/109,820, filed on Jan. 30, 2015.

(51) Int. Cl.
*C08G 77/38* (2006.01)
*C08G 65/00* (2006.01)
(Continued)

(52) U.S. Cl.
CPC .......... *C08G 65/007* (2013.01); *C08G 77/38* (2013.01); *C08G 77/385* (2013.01);
(Continued)

(58) Field of Classification Search
None
See application file for complete search history.

(56) References Cited

U.S. PATENT DOCUMENTS

| 4,743,667 | A | * | 5/1988 | Mizutani | ............... | C08F 230/08 |
| | | | | | | 526/245 |
| 5,321,108 | A | * | 6/1994 | Kunzler | ................. | C08F 30/08 |
| | | | | | | 523/107 |

(Continued)

FOREIGN PATENT DOCUMENTS

| JP | 2011-114835 A | 4/2001 |
| JP | 2001240774 A | 9/2001 |

(Continued)

OTHER PUBLICATIONS

PCT/US2015/019557 International Search Report dated May 29, 2015.

*Primary Examiner* — Robert S Loewe
(74) *Attorney, Agent, or Firm* — Matthew T. Fewkes

(57) ABSTRACT

A fluorinated compound having at least one (meth)acrylate functional group disclosed. A curable composition comprising the fluorinated compound and polyfunctional acrylate, a cured product formed from the curable composition, and method of forming the cured product are also disclosed.

13 Claims, 1 Drawing Sheet

Figures 1A, 1B, 1C, 1D:
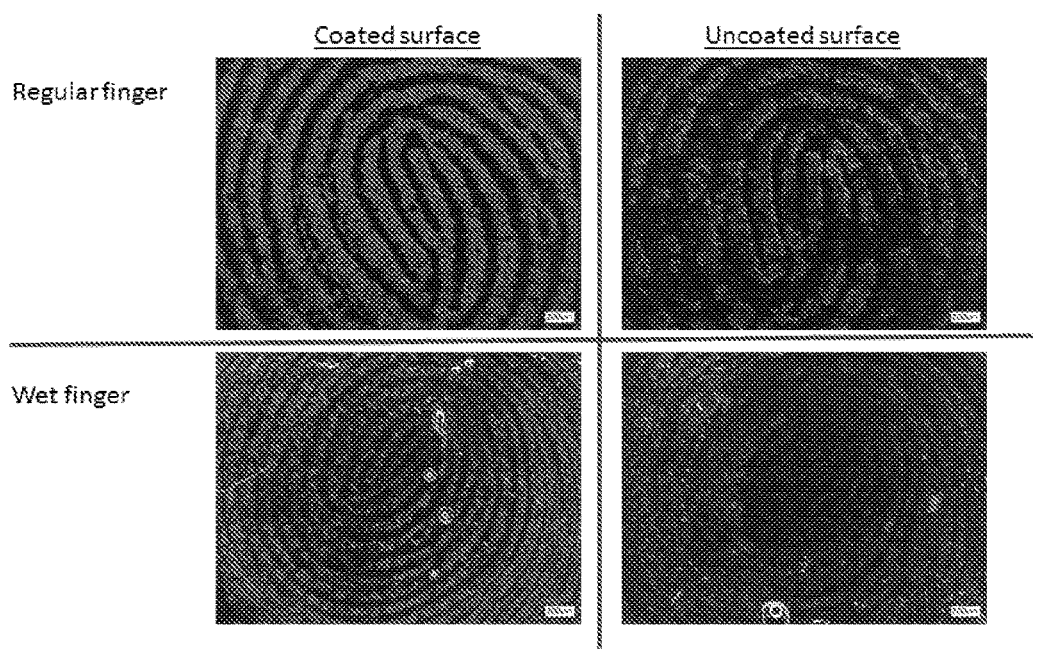

(51) Int. Cl.
  *C08L 33/08* (2006.01)
  *C09D 183/08* (2006.01)
  *C08G 77/395* (2006.01)
  *C08G 77/48* (2006.01)
  *C08G 77/50* (2006.01)
  *C08G 77/385* (2006.01)
  *C08L 35/02* (2006.01)
  *C09D 135/02* (2006.01)

(52) U.S. Cl.
  CPC ........... *C08G 77/395* (2013.01); *C08G 77/48* (2013.01); *C08G 77/50* (2013.01); *C08L 33/08* (2013.01); *C08L 35/02* (2013.01); *C09D 135/02* (2013.01); *C09D 183/08* (2013.01); *C08G 2650/04* (2013.01); *C08G 2650/16* (2013.01); *C08G 2650/64* (2013.01); *C08L 2203/16* (2013.01); *C08L 2205/03* (2013.01)

(56) References Cited

U.S. PATENT DOCUMENTS

| | | | |
|---|---|---|---|
| 5,378,735 A | 1/1995 | Hosokawa et al. | |
| 5,391,589 A * | 2/1995 | Kiguchi | G02B 1/043 264/1.36 |
| 5,418,304 A | 5/1995 | Mueller et al. | |
| 5,714,557 A | 2/1998 | Kunzler et al. | |
| 5,831,110 A | 11/1998 | Isoda et al. | |
| 5,840,428 A | 11/1998 | Blizzard et al. | |
| 5,959,117 A * | 9/1999 | Ozark | C07F 7/0852 523/107 |
| 6,376,576 B2 | 4/2002 | Kang et al. | |
| 6,566,413 B1 * | 5/2003 | Weinmann | A61K 6/083 424/401 |
| 6,586,548 B2 * | 7/2003 | Bonafini, Jr. | C08F 230/08 526/279 |
| 7,173,778 B2 | 2/2007 | Jing et al. | |
| 7,642,299 B2 * | 1/2010 | Yoshikawa | C07F 7/0852 428/421 |
| 7,837,934 B2 * | 11/2010 | Linhardt | A45C 11/005 422/28 |
| 8,178,613 B2 | 5/2012 | Nakashima et al. | |
| 2004/0181008 A1 | 9/2004 | Hanazawa et al. | |
| 2005/0256286 A1 | 11/2005 | Asch et al. | |
| 2006/0106187 A1 | 5/2006 | Kennedy | |
| 2010/0149262 A1 | 6/2010 | Lin et al. | |
| 2011/0135905 A1 | 6/2011 | Wakita et al. | |
| 2011/0195256 A1 | 8/2011 | Morikawa et al. | |

FOREIGN PATENT DOCUMENTS

| | | |
|---|---|---|
| JP | 2007297543 A | 11/2007 |
| KR | 700684 B1 | 3/2007 |

* cited by examiner

FLUORINATED COMPOUND, CURABLE COMPOSITION COMPRISING SAME, AND CURED PRODUCT

CROSS REFERENCE TO RELATED APPLICATIONS

This application is a U.S. national stage filing under 35 U.S.C. § 371 of PCT Application No. PCT/US2015/019563 filed on Mar. 10, 2015, currently pending, which claims the benefit of U.S. Provisional Patent Application No. 61/954,096 filed under 35 U.S.C. § 119 (e) on Mar. 17, 2014 and U.S. Provisional Patent Application No. 62/109,820 filed under 35 U.S.C. § 119 (e) on Jan. 30, 2015. PCT Application No. PCT/US2015/019563 and U.S. Provisional Patent Application Nos. 61/954,096 and 62/109,820 are hereby incorporated by reference.

FIELD OF THE INVENTION

The invention generally relates to a fluorinated compound and, more specifically, to a fluorinated compound having at least one (meth)acrylate functional group, a curable composition comprising the fluorinated compound, and a cured product formed with the curable composition.

DESCRIPTION OF THE RELATED ART

Fluorinated compounds are known in the art and are utilized in various applications and end uses. For example, fluorinated compounds are commonly utilized in curable compositions. The curable compositions are applied to substrates and cured to form layers or coatings on the substrates.

Layers formed from curable compositions comprising fluorinated compounds may have diverse and desirable physical properties contingent on the components of the curable compositions. Such layers may be utilized to modify or improve physical properties of or otherwise protect the substrate. For example, certain layers are commonly utilized for smudge and stain resistance or to provide surfaces that are easy to clean. Other layers are utilized for providing protection to the underlying substrate, such as water repellency and/or resistance to scratching.

It is desirable for the curable compositions to have excellent physical properties, such as storage stability. Such physical properties associated with the curable compositions must be balanced with the desired properties of the resulting layers formed from the curable compositions. For example, it is desirable for the layers to have high adhesion to the substrate while providing scratch resistance and easy to clean surfaces.

SUMMARY OF THE INVENTION

The invention provides a fluorinated compound having the general formula (1):

(1)

wherein each R is an independently selected substituted or unsubstituted hydrocarbyl group; each $R^1$ is independently selected from R, —Y—$R_f$, and a (meth)acrylate functional group; $R_f$ is a fluoro-substituted group; Y is a covalent bond or a bivalent linking group; each $Y^1$ is independently a covalent bond or a bivalent linking group; X has the general formula (2):

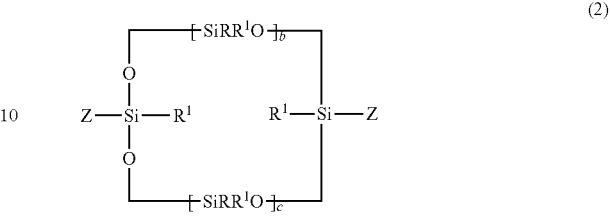

(2)

$X^1$ has the general formula (3):

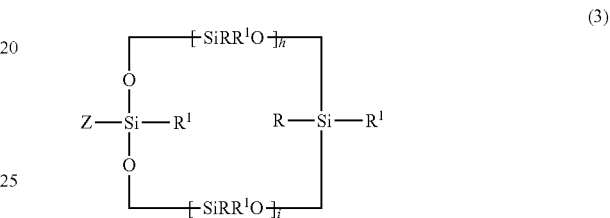

(3)

Z is a covalent bond; subscripts a and g are each 0 or 1, with the proviso that when a is 1, g is 1; subscripts b and c are each 0 or an integer from 1 to 10, with the proviso that when a is 1, at least one of b and c is at least 1; subscripts d and f are each independently 0 or 1; subscript e is 0 or an integer from 1 to 10; subscripts h and i are each 0 or an integer from 1 to 10, with the proviso that when g is 1, at least one of h and i is at least 1; subscript j is 0 or an integer from 1 to 3; and subscript k is 0 or 1, with the provisos that k is 1 when a and g are each 0 and k is 0 when g is 1; with the proviso that a, e, and g are not simultaneously 0; wherein at least one $R^1$ is a (meth)acrylate functional group and at least one $R^1$ is represented by —Y—$R_f$. Because the cyclic moiety represented by X includes two covalent bonds each represented by Z, the cyclic moiety represented by X generally is not monovalent. In contrast, because the cyclic moiety represented by $X^1$ includes but one covalent bond represented by Z, the cyclic moiety represented by $X^1$ generally is monovalent.

The invention also provides a curable composition. The curable composition comprises the fluorinated compound and a polyfunctional acrylate.

Finally, the invention provides a cured product. The cured product is formed by curing the curable composition.

BRIEF DESCRIPTION OF THE DRAWING(S)

FIGS. 1a to 1d are photographic images of fingerprints on plastic boards.

DETAILED DESCRIPTION OF THE INVENTION

The invention provides a fluorinated compound. The fluorinated compound is particularly suitable for use in a curable composition, which is provided along with a cured product formed by curing the curable composition. The fluorinated compound, curable composition, cured product formed from the curable composition, and a method of forming the cured product are each described below.

The fluorinated compound has the general formula (1):

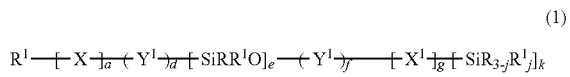

(1)

wherein each R is an independently selected substituted or unsubstituted hydrocarbyl group; each $R^1$ is independently selected from R, —Y—$R_f$, and a (meth)acrylate functional group; $R_f$ is a fluoro-substituted group; Y is a covalent bond or a bivalent linking group; each $Y^1$ is independently a covalent bond or a bivalent linking group;

X has the general formula (2):

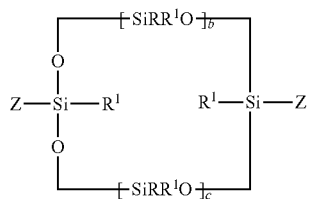

(2)

$X^1$ has the general formula (3):

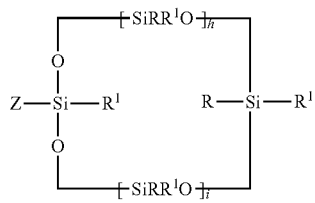

(3)

Z is a covalent bond; subscripts a and g are each 0 or 1, with the proviso that when a is 1, g is 1; subscripts b and c are each 0 or an integer from 1 to 10, with the proviso that when a is 1, at least one of b and c is at least 1; subscripts d and f are each independently 0 or 1; subscript e is 0 or an integer from 1 to 10; subscripts h and i are each 0 or an integer from 1 to 10, with the proviso that when g is 1, at least one of h and i is at least 1; subscript j is 0 or an integer from 1 to 3; and subscript k is 0 or 1, with the provisos that k is 1 when a and g are each 0 and k is 0 when g is 1; with the proviso that a, e, and g are not simultaneously 0; wherein at least one $R^1$ of the fluorinated compound is a (meth)acrylate functional group and at least one $R^1$ of the fluorinated compound is represented by —Y—$R_f$.

R, which is an independently selected substituted or unsubstituted hydrocarbyl group, may be aliphatic, aromatic, cyclic, alicyclic, etc. Further, R may include ethylenic unsaturation or lack ethylenic unsaturation. By "substituted," it is meant that one or more hydrogen atoms of the hydrocarbyl may be formally replaced with atoms other than hydrogen (e.g. a halogen atom, such as chlorine, fluorine, bromine, or iodine; alternatively oxygen, sulfur, or nitrogen. R typically has from 1 to 22, alternatively from 1 to 10, carbon atoms. For example, R may have from 1 to 6 carbon atoms when aliphatic, 3 to 10 carbon atoms when alicyclic, or from 6 to 10 carbon atoms when aromatic. Substituted or unsubstituted hydrocarbyl groups containing at least 3 carbon atoms can have a branched or unbranched carbon structure. Examples of hydrocarbyl groups represented by R include, but are not limited to, alkyl, such as ($C_1$-$C_{10}$) alkyl, including methyl, ethyl, propyl, butyl, hexyl, heptyl, octyl, nonyl, decyl, and isomers of such groups; alkenyl, such as ($C_2$-$C_6$) alkenyl, including vinyl, allyl, and hexenyl; cycloalkyl, such as $C_5$-$C_6$) cycloalkyl, including cyclopentyl, cyclohexyl, and methylcyclohexyl; aryl, such as phenyl and naphthyl; alkaryl, such as tolyl and xylyl; and aralkyl, such as benzyl and phenethyl. Examples of halogen-substituted hydrocarbyl groups represented by R are exemplified by 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

$R^1$ is independently selected from R, —Y—$R_f$, and a (meth)acrylate functional group, where $R_f$ is a fluoro-substituted group and Y is a covalent bond or a bivalent linking group. The bivalent linking group designated by Y may be, for example, a hydrocarbylene, a heterohydrocarbylene, or an organoheterylene linking group. Alternatively, the bivalent linking group designated by Y may comprise an -(O-Si)- linking group, which may have up to 20 repeating -(O-Si)- units. Alternatively still, the bivalent linking group designated by Y may comprise both carbon-carbon and silicon-oxygen bonds. The bivalent group may be substituted, e.g. as described above for the hydrocarbyl group. For example, the bivalent group may be halogenated, e.g. fluorinated. However, Y may merely represent a covalent bond that connects $R_f$ to the rest of the fluorinated compound. At least one $R^1$ is —Y—$R_f$ and at least one $R^1$ is a (meth)acrylate functional group in the fluorinated compound. In certain embodiments, one $R^1$ of the fluorinated compound is —Y—$R_f$. In these or other embodiments, two or more groups represented by $R^1$ are (meth)acrylate functional groups. For example, from 2 to 10 groups represented by $R^1$ may be (meth)acrylate functional groups. The (meth)acrylate functional groups may be any functional groups including acrylate functionality. For example, the (meth)acrylate functional groups are generally monovalent and may be independently derived from methyl(meth)acrylate, ethyl(meth)acrylate, propyl(meth)acrylate, n-butyl(meth)acrylate, isobutyl(meth)acrylate, t-butyl(meth)acrylate, pentyl(meth)acrylate, hexyl(meth)acrylate, cyclohexyl(meth)acrylate, benzyl(meth)acrylate, 2-ethylhexyl(meth)acrylate, heptyl(meth)acrylate, n-octyl(meth)acrylate, etc.

$R_f$ of general formula (1) is a group that is fluoro-substituted, which means that at least one portion, segment, or moiety of $R_f$ is fluoro-substituted. $R_f$ may be partially fluorinated or perfluorinated. By partially fluorinated, it means that $R_f$ may be monofluorinated or polyfluorinated, but not perfluorinated. For example, partially fluorinated encompasses mono-fluorination, where there is but one fluorine substitution in $R_f$, and polyfluorination, where there are two or more fluorine substitutions in $R_f$. $R_f$ is monovalent.

For example, $R_f$ may an organic group or segment, a silicone group or segment, or combinations thereof. Organic groups, as used herein, are distinguished from silicone groups, with silicone groups having a backbone comprising siloxane bonds (Si—O—Si) and organic groups having a backbone that is carbon-based and lacking siloxane bonds. $R_f$ may comprise both siloxane bonds and carbon bonds in the backbone.

When $R_f$ is a silicone group, the fluoro-substitution is generally present in one or more hydrocarbyl substituents bonded to silicon. Said differently, the fluorine atom(s) are generally not bonded directly to silicon atoms. For example, the silicon atoms of the silicone group generally each have two substituents in addition to the siloxane bonds, and these substituents may independently be fluoro-substituted. As one specific example, when $R_f$ is a silicone group, $R_f$ may comprise the group $Si(CF_3)_2O$, where $CF_3$ groups are representative of the fluoro-substitution. Because $R_f$ need not be perfluorinated, this one group of $R_f$ may alternatively be, for example, $Si(CFH_2)(CH_3)O$, where there is but one fluorine substitution. This specific group, if present in $R_f$, is generally endblocked, e.g. trihydrocarbyl endblocked, as $R_f$ is monovalent.

Alternatively, as set forth above, $R_f$ may be a fluoro-substituted organic group or segment. In these embodiments, $R_f$ may be, for example, a fluoro-substituted alkyl group or a fluoro-substituted alkoxy group. The alkoxy group may independently repeat, e.g. as an alkoxyalkoxy group. When $R_f$ is a fluoro-substituted alkyl group, $R_f$ typically comprises repeating $CF_2$ groups with a terminal $CF_3$ group (if perfluorinated). When $R_f$ is a fluoro-substituted alkoxy group, $R_f$ includes one or more oxygen atoms and may comprise $OCH_2$ groups and $CF_2$ groups with a terminal $CF_3$ group.

In certain embodiments, $R_f$: (i) is partially fluorinated; (ii) comprises a perfluoropolyether segment; or (iii) both (i) and (ii). When $R_f$ is both (i) and (ii), $R_f$ includes a substituent, moiety, or group that is not perfluorinated such that although $R_f$ comprises a perfluorinated segment, the $R_f$ as an overall segment is not perfluorinated, but rather partially fluorinated. $R_f$ may be referred to as a polyfluoropolyether segment, which encompasses embodiments in which $R_f$ is and is not perfluorinated. When $R_f$ comprises the perfluoropolyether segment, $R_f$ is typically an organic group or segment.

When $R_f$ comprises the perfluoropolyether segment, specific examples of moieties that may be present in $R_f$ include $-(CF_2)-$, $-(CF(CF_3)CF_2O)-$, $-(CF_2CF(CF_3)O)-$, $-(CF(CF_3)O)-$, $-(CF(CF_3)-CF_2)-$, $-(CF_2-CF(CF_3))-$, and $-(CF(CF_3))-$. Such moieties may be present in any order within the perfluoropolyether segment of $R_f$ and may be in randomized or block form. Each moiety may independently be present two or more times in the perfluoropolyether segment of $R_f$. Generally, the perfluoropolyether segment of $R_f$ is free from oxygen-oxygen bonds, with oxygen generally being present as a heteroatom between adjacent carbon atoms so as to form an ether linkage. The perfluoropolyether segment may terminate with a $CF_3$ group.

In one specific embodiment when of $R_f$ comprises the perfluoropolyether segment, the perfluoropolyether segment comprises moieties having the general formula (5):

   (5);

wherein subscripts x, y, and z are each independently selected from 0 and an integer from 1 to 40, with the proviso that all three of x, y, and z are not simultaneously 0. If x and y are both 0, then z is an integer from 1 to 40 and at least one other perfluoroether moiety is present in the perfluoropolyether segment. The subscripts y and z may be 0 and x is selected from integers from 1 to 40, alternatively the subscripts x and y is 0 and z is selected from integers from 1 to 40; alternatively the subscripts x and z is 0 and y is selected from integers from 1 to 40. The subscript z may be 0 and x and y are each independently selected from integers from 1 to 40, alternatively the subscript y is 0 and x and z are each independently selected from integers from 1 to 40; alternatively the subscript x is 0 and y and z are each independently selected from integers from 1 to 40. Typically, x, y, and z are each independently selected from integers from 1 to 40. The moieties represented by subscripts x and y may be independently branched or linear. For example, $(C_3F_6O)$ may independently be represented by $CF_2CF_2CF_2O$, $CF(CF_3)CF_2O$ or $CF_2CF(CF_3)O$.

Specific examples of $R_f$ include any of the polyfluoropolyether segments suitable for the polyfluoropolyether silanes disclosed in co-pending U.S. Appln. Publ. No. US 2014/0272111 A1, which is incorporated by reference herein in its entirety.

In certain embodiments, Y is the heterohydrocarbylene linking group. In such embodiments, one example of Y has the general formula (8):

   (8);

wherein m and n are each integers independently from 1 to 5. Subscript m is typically 1 and subscript n is typically 3, with the unit indicated by subscript n being bonded to the fluorinated compound and the unit indicated by subscript m being bonded to $R_f$. In these embodiments, $R_f$ is typically perfluorinated. Because Y may be a covalent bond, the bivalent linking group of general formula (8) may be encompassed within $R_f$, in which case $R_f$ is not perfluorinated but may contain the perfluoropolyether segment.

The (meth)acrylate functional group represented by $R^1$ may be bonded to a carbon atom of the fluorinated compound and/or a silicon atom of the fluorinated compound. The (meth)acrylate functional group may be bonded directly to carbon and/or silicon in the backbone of the fluorinated compound or may be bonded to the carbon and/or silicon in the backbone of the fluorinated compound via a bivalent linking group, such as any of those described above for Y.

Each $Y^1$ is independently a covalent bond or a bivalent linking group. Examples of such bivalent linking groups are set forth above for Y. Because subscripts d and f are each independently 0 or 1, $Y^1$ may be absent from the fluorinated compound altogether (e.g. when d and f are each 0).

The moieties represented by X and $X^1$ are each cyclic moieties. Because the cyclic moiety represented by X includes two covalent bonds each represented by Z, the cyclic moiety represented by X generally is not monovalent. In contrast, because the cyclic moiety represented by $X^1$ includes but one covalent bond represented by Z, the cyclic moiety represented by $X^1$ generally is monovalent. As such, when subscript g, which indicates the cyclic moiety represented by $X^1$, is 1, subscript k, which indicates a terminal group, is 0.

Subscripts a, e, and g are not simultaneously 0. As such, the fluorinated compound includes at least one siloxane moiety indicated by subscripts a, e, and/or g. The siloxane moiety may be the cyclic moiety represented by X and $X^1$, respectively, which are each indicated by subscripts a and g, respectively, and/or a linear moiety indicated by subscript e (which may be referred to as a siloxane block). For example, the fluorinated compound may include one cyclic moiety, one cyclic moiety and one linear moiety, one linear moiety, two cyclic moieties and one linear moiety, etc.

It certain embodiments, the fluorinated compound is linear, i.e., the fluorinated compound does not include the cyclic moiety represented by X and $X^1$, respectively. In these embodiments, subscripts a, d, f, and g are each 0, subscript e is an integer from 1 to 10, and subscript k is 1. In these embodiments, the fluorinated compound has the general formula (4):

(4)

wherein R, $R^1$, and subscripts e and j are each defined above. The —Y—$R_f$ represented by $R^1$ is typically terminal, i.e., not within the siloxane block indicated by subscript e. The fluorinated compound may include more than one —Y—$R_f$ represented by $R^1$, in which case at least one —Y—$R_f$ represented by $R^1$ may be pendant from the siloxane block indicated by subscript e. Typically, the at least one (meth)acrylate functional group represented by $R^1$ is also terminal. If a terminal of the fluorinated compound includes two groups represented by $R^1$, the terminal may include both —Y—$R_f$ and a (meth)acrylate functional group each represented by $R^1$, although such groups are generally at opposite terminals of the fluorinated compound. The fluorinated compound generally includes more than one, e.g. from 3 to 10, (meth)acrylate functional groups each represented by $R^1$. In these embodiments, each (meth)acrylate functional group may independently be terminal or pendant in the fluorinated compound.

In other embodiments, the fluorinated compound includes one cyclic moiety represented by X and one cyclic moiety represented by $X^1$. In such embodiments, the cyclic moieties represented by X and $X^1$ are linked to one another via at least one bivalent linking group, such as $Y^1$ indicated by subscripts d and/or f, optionally in combination with the siloxane block indicated by subscript e. In these embodiments, subscripts a and g are each 1 and subscript k is 0 such that said fluorinated compound has the general formula (5):

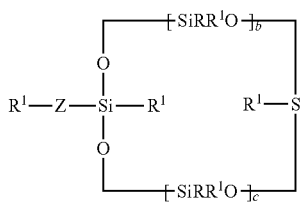

(5)

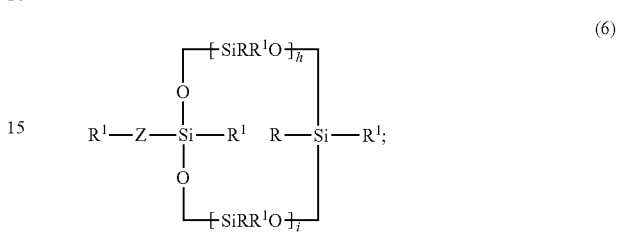

wherein R, $R^1$, Z, $Y^1$, and subscripts b, c, d, e, f, h, and i are each defined above. Because each Z represents a covalent bond, each $Y^1$, indicated by d and f, respectively, is either the bivalent linking group or absent from the fluorinated compound (such as when d or f is 0) such that two adjacent covalent bonds are not present in general formula (5) above.

In these embodiments, because both terminals are cyclic moieties, the —Y—$R_f$ represented by $R^1$ is typically pendant from at least one of the cyclic moieties of general formula (5). Alternatively or in addition, the —Y—$R_f$ represented by $R^1$ may be within the siloxane block indicated by subscript e. The fluorinated compound may include more than one —Y—$R_f$ represented by $R^1$, in which case two or more —Y—$R_f$ represented by $R^1$ may be pendant from the same cyclic moiety, different cyclic moieties, etc. Typically, in the embodiments of general formula (5), the at least one (meth)acrylate functional group represented by $R^1$ is within one or more of the cyclic moieties of the fluorinated compound, rather than the siloxane block indicated by subscript e. Typically, each cyclic moiety includes at least one (meth)acrylate functional group each represented by $R^1$. The fluorinated compound generally includes more than one, e.g. from 3 to 10, (meth)acrylate functional groups each represented by $R^1$. In these embodiments, each (meth)acrylate functional group may independently be terminal or linear.

In yet other embodiments, the fluorinated compound includes but one cyclic moiety represented by $X^1$ but not the cyclic moiety represented by X or the siloxane block indicated by subscript e. In these embodiments, subscripts a, d, e, f, and k are each 0 such that said fluorinated compound has the general formula (6):

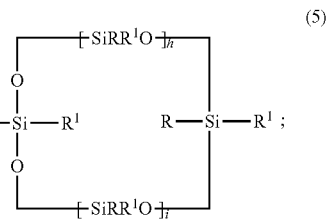

(6)

wherein R, $R^1$, Z, and subscripts h and i are each defined above.

In these embodiments, because the fluorinated compound itself is cyclic, the —Y—$R_f$ represented by $R^1$ is necessarily pendant from the cyclic moiety of general formula (6), which is the entire fluorinated compound of general formula (6).

Combinations of different fluorinated compounds together may be utilized as the fluorinated compound.

The fluorinated compound may be prepared via various synthetic pathways. For example, the fluorinated compound may be prepared by reacting a polyfluoropolyether compound including an ethylenically unsaturated group with an organopolysiloxane having at least one silicon-bonded hydrogen atom. In these embodiments, the fluorinated compound is prepared in the presence of a catalyst via a hydrosilylation reaction. For example, the silicon-bonded hydrogen atom of the organopolysiloxane and the ethylenically unsaturated group of the polyfluoropolyether compound generally react and form a covalent bond. Typically, the organopolysiloxane includes two or more silicon-bonded hydrogen atoms.

Further, in this embodiment, a (meth)acrylate compound having an ethylenic unsaturated group (other than or in addition to the (meth)vinyl group of (meth)acrylate) is also utilized as a reactant to impart the fluorinated compound with the at least one (meth)acrylate functional group. For example, the silicon-bonded hydrogen atom of the organopolysiloxane and the ethylenically unsaturated group of the (meth)acrylate compound generally react and form a covalent bond, resulting in the fluorinated compound having at least one (meth)acrylate functional group. Depending on a number of silicon-bonded hydrogen atoms of the organopolysiloxane, the fluorinated compound may have two or more (meth)acrylate functional groups and/or two or more groups designated by —Y—R$_f$ which are attributable to the polyfluoropolyether compound. However, the at least one (meth)acrylate functional group of the fluorinated compound may be attached thereto via other synthetic pathways known in the art. Alternatively still, the organopolysiloxane may include the at least one (meth)acrylate functional group prior to reacting with the polyfluoropolyether compound.

The polyfluoropolyether compound, the organopolysiloxane, and the (meth)acrylate compound are generally selected based on a desired structure of the fluorinated compound.

For example, the polyfluoropolyether compound generally has the general formula (9):

$$R_f—Y—Y' \quad (9);$$

wherein $R_f$ and Y are each defined above, and Y' designates the ethylenically unsaturated group. The polyfluoropolyether compound is generally referred to as such based on $R_f$, as described above. For example, depending on a selection for Y and Y', the polyfluoropolyether compound may have the general formula $R_f$—CH$_2$—O—CH$_2$—CH=CH$_2$. Y may be a covalent bond, in which case Y' represents —CH$_2$—O—CH$_2$—CH=CH$_2$, or Y may represent some portion of this moiety, e.g. —CH$_2$—O— or —CH$_2$—O—CH$_2$— with the balance of this moiety being designated by Y'. The ethylenic unsaturation need not be terminal in the polyfluoropolyether compound. For example, the polyfluoropolyether compound may have the general formula $R_f$—CH$_2$—O—CH=CH—CH$_3$.

The organopolysiloxane may be linear, cyclic, branched, or combinations thereof. For example, when the fluorinated compound has the general formula (4) above, the organopolysiloxane is typically linear and comprises repeating D units capped with M units. The silicon-bonded hydrogen atoms may be present in the D units and/or the M units such that the silicon-bonded hydrogen atoms may be pendant, terminal, or both. Alternatively, when the fluorinated compound has the general formula (5) or (6) above, the organopolysiloxane is typically cyclic or at least includes a cyclic portion.

For example, for the fluorinated compound of general formula (6), the organopolysiloxane may be represented by (OSiR$^2_2$)$_q$, wherein each R$^2$ is independently selected from R and hydrogen, with at least two R$^2$ being hydrogen, and q is an integer of from 3 to 50, alternatively from 3 to 20, alternatively from 3 to 15, and designates the number of repeating disiloxy units within the organopolysiloxane. In such embodiments, this organopolysiloxane becomes the cyclic moiety represented by X$^1$ and indicated by g in general formula (1).

Alternatively still, for the fluorinated compound of general formula (5), the organopolysiloxane generally includes two cyclic moieties bonded to one another via a bivalent linking group, e.g. —(Y$^1$)$_d$—[SiRR$^1$O]$_e$—(Y$^1$)$_f$—, as in general formula (5).

The organopolysiloxane generally includes silicon-bonded hydrocarbyl groups as well, which may be any of those described above with respect to R.

The (meth)acrylate compound is also selected based on the desired structure of the fluorinated compound. One specific exemplary (meth)acrylate compound is allyl methacrylate, which has the following structure:

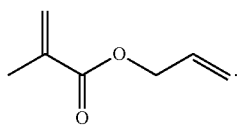

Another specific exemplary (meth)acrylate compound has the following structure:

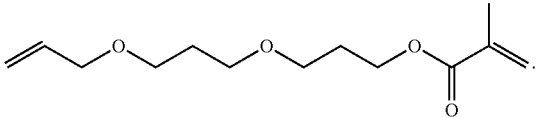 [SMILES: C=CCOCCCOCCCOC(=O)C(=C)C]

Combinations of different (meth)acrylate compounds, different organopolysiloxanes, and/or different polyfluoropolyether compounds may be utilized, which results in the fluorinated compound comprising a blend of different fluorinated compounds having different structures.

The molar ratios of the polyfluoropolyether compound, the organopolysiloxane, and the (meth)acrylate compound may vary based on a desired structure of the fluorinated compound. For example, as set forth above, the fluorinated compound has at least one —Y—R$_f$ represented by R$^1$. Typically, the fluorinated compound includes only one —Y—R$_f$ represented by R$^1$, in which case the polyfluoropolyether compound and the organopolysiloxane are reacted in a molar ratio of about 1:1. However, the polyfluoropolyether compound and the organopolysiloxane may be reacted in a molar ratio of 10:1 to 1:10; alternatively from 5:1 to 1:5; alternatively from 2:1 to 1:2; of the polyfluoropolyether compound to the organopolysiloxane.

Similarly, as set forth above, the fluorinated compound has at least one (meth)acrylate functional group represented by R$^1$. Typically, the fluorinated compound includes two or more (meth)acrylate functional groups represented by R$^1$, in which case the (meth)acrylate compound is utilized in a molar excess as compared to the organopolysiloxane. For example, the (meth)acrylate compound may be utilized along with the organopolysiloxane in a molar ratio of at least 2:1, alternatively at least 3:1, alternatively at least 4:1, alternatively at least 5:1, e.g. up to 20:1 or 50:1, of the (meth)acrylate compound to the organopolysiloxane.

The polyfluoropolyether compound, the organopolysiloxane, and the (meth)acrylate compound may be reacted to form the fluorinated compound via various techniques. For example, the polyfluoropolyether compound, the organopolysiloxane, and the (meth)acrylate compound may be disposed in a vessel, optionally in the presence of a solvent, vehicle, and/or catalyst. The catalyst is typically utilized and comprises a hydrosilylation catalyst. Solvent can be any solvent different from the polyfluoropolyether compound, the organopolysiloxane, and the (meth)acrylate compound that is capable of solubilizing the polyfluoropolyether compound, the organopolysiloxane, and/or the (meth)acrylate compound. The vehicle may differ from the solvent in that the vehicle only partially solubilizes, alternatively does not solubilize, the polyfluoropolyether compound, the organopolysiloxane, and/or the (meth)acrylate compound.

The vessel is typically heated to an elevated temperature, e.g. from 50 to 150, alternatively from 75 to 125, alternatively from 90 to 110, degrees Celsius (° C.). The vessel may be heated at the elevated temperature for a period of time to effect the reaction between the polyfluoropolyether compound, the organopolysiloxane, and the (meth)acrylate compound, e.g. from 30 to 180, alternatively from 45 to 150, alternatively from 60 to 120, minutes. If desired, the reaction may be carried out sequentially. For example, the polyfluoropolyether silane may be reacted, e.g. consumed, prior to addition of the (meth)acrylate compound. Alternatively, all of the components may be combined and reacted simultaneously.

The hydrosilylation catalyst can be any of the well-known hydrosilylation catalysts comprising a noble metal (i.e., platinum, rhodium, ruthenium, palladium, osmium and iridium) or a compound containing a noble metal.

Specific hydrosilylation catalysts include the complexes of chloroplatinic acid and certain vinyl-containing organosiloxane disclosed by Willing in U.S. Pat. No. 3,419,593, the portions of which address hydrosilylation catalysts are hereby incorporated by reference. A catalyst of this type is the reaction product of chloroplatinic acid and 1,3-diethenyl-1,1,3,3-tetramethyldisiloxane.

The hydrosilylation catalyst can also be a supported hydrosilylation catalyst comprising a solid support having a noble metal on the surface thereof. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

In addition or alternatively, the hydrosilylation catalyst can be a microencapsulated noble metal-containing catalyst comprising a noble metal (e.g. platinum) encapsulated in a thermoplastic resin. Alternatively still, the hydrosilylation catalyst may be photoactivated.

Progress of the reaction to form the fluorinated compound may be monitored via various techniques, such as spectroscopy, e.g. infrared (IR) spectroscopy.

For illustrative purposes only, an exemplary example of a reaction scheme that may be relied upon to prepare a particular fluorinated compound is set forth below. In the scheme below, various reactions are illustrated utilizing different types of organopolysiloxanes:

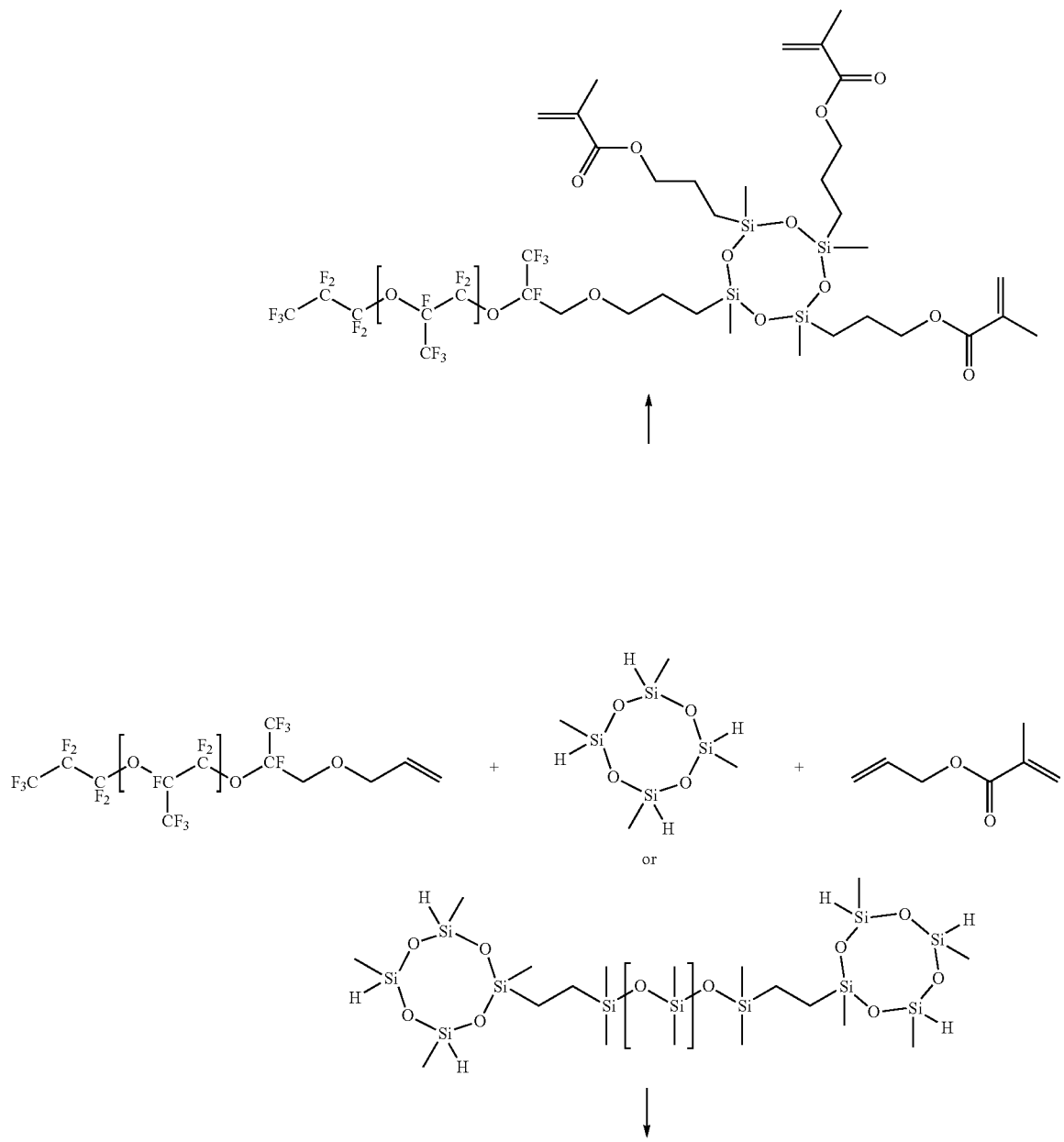

-continued
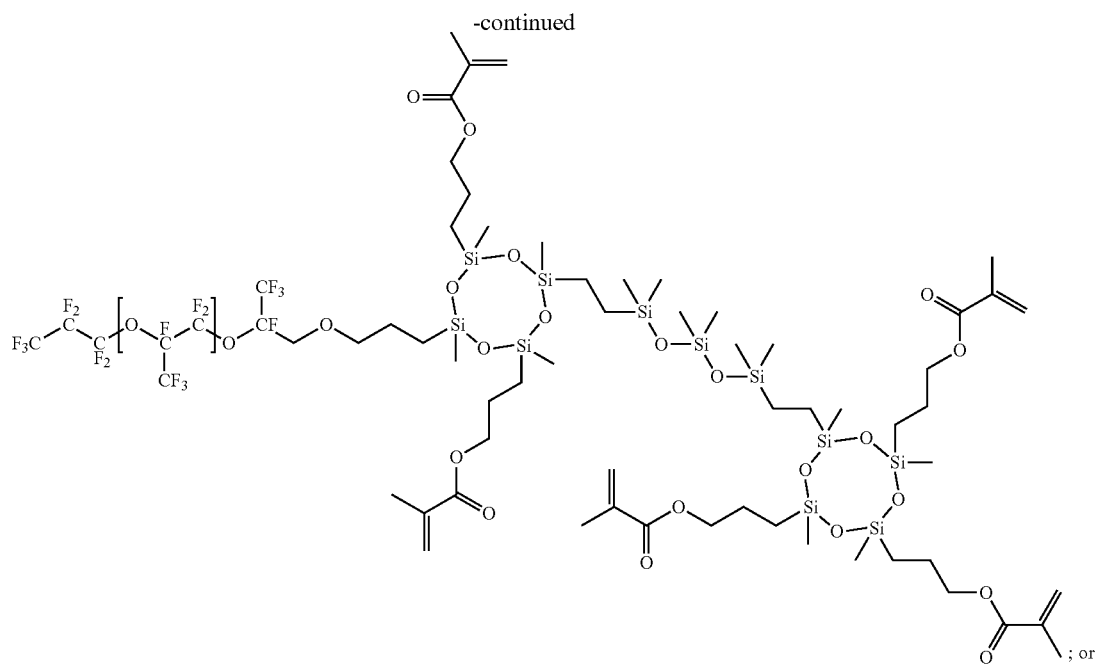
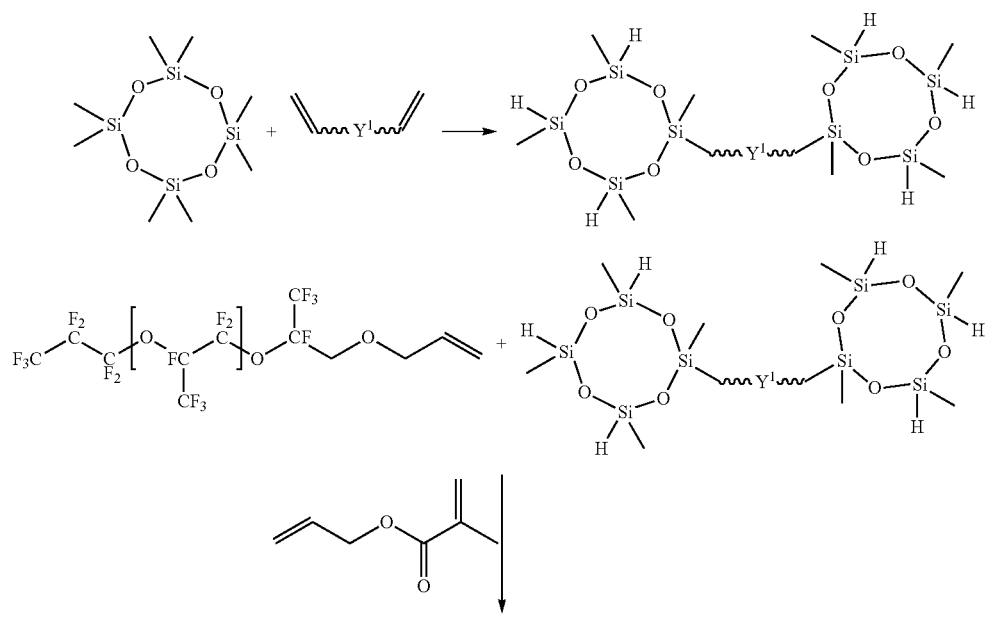

-continued

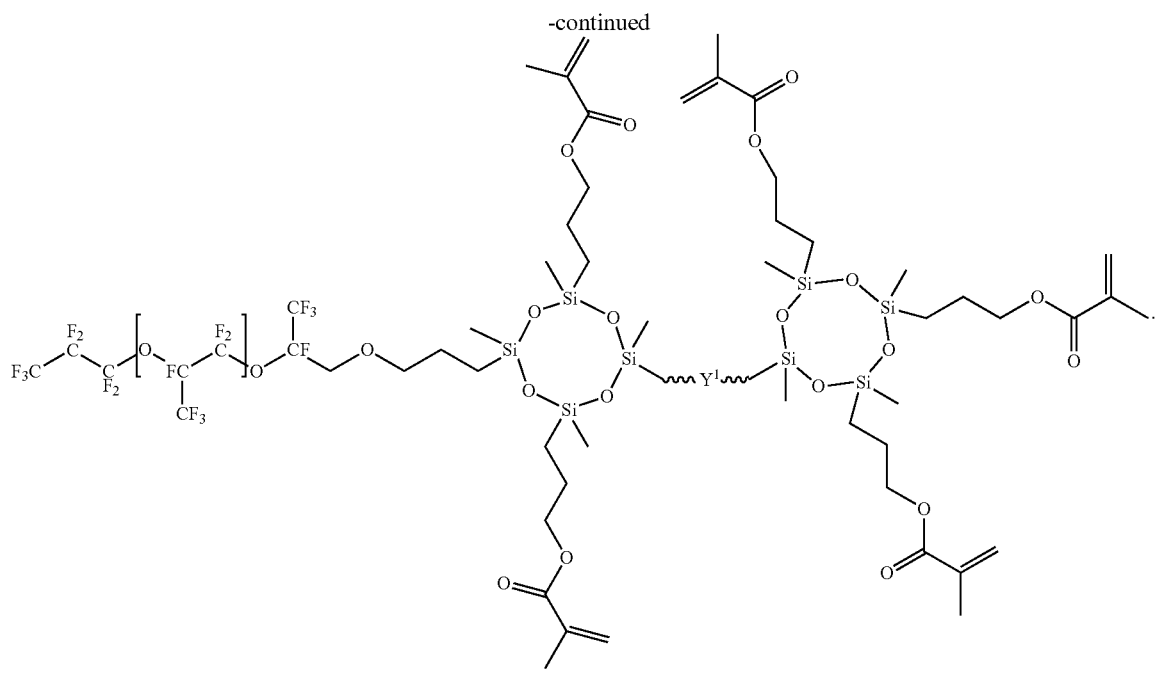

The fluorinated compound may be utilized in various compositions, end uses, and/or applications. Because the fluorinated compound includes at least one (meth)acrylate functional group, the fluorinated compound may be referred to as reactive, as (meth)acrylate functional groups are reactive with certain functional groups. The fluorinated compound may be utilized as a discrete component, disposed in a solvent or vehicle to form a composition, combined with one or more other components to form a composition, reacted with another compound, etc. Alternatively still, the fluorinated compound may be utilized for surface treatment, either discretely or in a composition, for various substrates, such as textile, ceramic, glass, or stone. Further, the fluorinated compound may be utilized in coating compositions, such as paints, or to modify other polymers.

The invention additionally provides a curable composition. The curable composition comprises the fluorinated polymer and a polyfunctional acrylate.

By "polyfunctional," with reference to the polyfunctional acrylate, means that the polyfunctional acrylate has two or more acrylate functional groups. In certain embodiments, the polyfunctional acrylate has at least 3, alternatively at least 4, alternatively at least 5, alternatively at least 6, alternatively at least 7, alternatively at least 8, alternatively at least 9, alternatively at least 10, acrylate functional groups. Higher numbers of acrylate functional groups may also be suitable, e.g. an icosafunctional acrylate. The polyfunctional acrylate may be monomeric, oligomeric, or polymeric in nature, and may comprise combinations thereof. For example, the polyfunctional acrylate may comprise a combination of a monomeric polyfunctional acrylate and an oligomeric polyfunctional acrylate. The polyfunctional acrylate may be linear, branched, or a combination of linear and branched polyfunctional acrylates.

The polyfunctional acrylate may be organic or silicone-based. When the polyfunctional acrylate is organic, the polyfunctional acrylate comprises a carbon-based backbone or chain, optionally with heteroatoms, such as O, therein. Alternatively, when the polyfunctional acrylate is silicone-based, the polyfunctional acrylate comprises a siloxane-based backbone or chain comprising siloxane (Si—O—Si) bonds. The polyfunctional acrylate may comprise both a carbon-based chain and a siloxane-based chain, such as if the polyfunctional acrylate is formed via hydrosilylation, in which case the polyfunctional acrylate is still referred to as being silicone-based due to the presence of siloxane bonds therein. In certain embodiments, when the polyfunctional acrylate is organic, the polyfunctional acrylate is free from any siloxane bonds, alternatively free from any silicon atoms. Typically, the polyfunctional acrylate is organic.

Specific examples of polyfunctional acrylates suitable for the purposes of include: difunctional acrylate monomers, such as 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetraethylene glycol dimethacrylate, 1,3-butylene glycol diacrylate, triethylene glycol diacrylate, triisopropylene glycol diacrylate, polyethylene glycol diacrylate and bisphenol A dimethacrylate; trifunctional acrylate monomers, such as trimethylolpropane triacrylate, trimethylolpropane trimethacrylate, pentaerythritol monohydroxytriacrylate and trimethylolpropane triethoxytriacrylate; tetrafunctional acrylate monomers, such as pentaerythritol tetraacrylate and ditrimethylolpropane tetraacrylate; penta- or higher polyfunctional monomers, such as dipentaerythritol hexaacrylate and dipentaerythritol (monohydroxy)pentaacrylate; bisphenol A epoxy diacrylate; hexafunctional aromatic urethane acrylate, aliphatic urethane diacrylate, and an acrylate oligomer of tetrafunctional polyester acrylate.

The polyfunctional acrylate may comprise a single polyfunctional acrylate or any combination of two or more polyfunctional acrylates. In certain embodiments, the polyfunctional acrylate comprises a penta- or higher polyfunctional acrylate, such as any polyfunctional acrylate from a pentafunctional acrylate to an icosafunctional acrylate, which may improve curing of the curable composition. For example, in certain embodiments, the polyfunctional acrylate comprises the penta- or higher polyfunctional acrylate in an amount of at least 30, alternatively at least 50, alternatively at least 75, alternatively at least 80, percent by weight based on the total weight of. Typically, the polyfunctional acrylate is free from any fluorine atoms, such as in fluoro-substituted groups.

In certain embodiments, the curable composition further comprises a fluoro-substituted compound having an aliphatic unsaturated bond. The fluoro-substituted compound is different from the fluorinated compound of the invention. Generally, the fluoro-substituted compound As with the polyfunctional acrylate, the fluoro-substituted compound may be organic or silicone-based, as described above. The aliphatic unsaturated bond may be a carbon-carbon double bond (C=C) or a carbon-carbon triple bond (C≡C), although the aliphatic unsaturated bond is typically a double bond. The fluoro-substituted compound may have one aliphatic unsaturated bond or two or more aliphatic unsaturated bonds. The aliphatic unsaturated bond may be located at any position within the fluoro-substituted compound, e.g. the aliphatic unsaturated bond may be terminal, pendant, or a part of a backbone of the fluoro-substituted compound. When the fluoro-substituted compound includes two or more aliphatic unsaturated bonds, each aliphatic unsaturated bond may be independently located in the fluoro-substituted compound, i.e., the fluoro-substituted compound may include pendant and terminal aliphatic unsaturated bonds, or other combinations of bond locations.

Like the fluorinated compound, in certain embodiments, the fluoro-substituted compound: (i) is partially fluorinated; (ii) comprises a perfluoropolyether segment; or (iii) both (i) and (ii). By partially fluorinated, it means that the fluoro-substituted compound is not perfluorinated. For example, partially fluorinated encompasses mono-substitution, where there is but one fluoro-substituted group, and polyfluorination, where there are two or more fluoro-substituted groups. The perfluoropolyether segment may be the same as or different from the perfluoropolyether segment of the fluorinated compound.

The perfluoropolyether compound (b-1) generally comprises a perfluoropolyether segment. The perfluoropolyether segment of the perfluoropolyether compound (b-1) typically becomes the perfluoropolyether segment, if present, of the resulting fluoro-substituted compound formed in part from the perfluoropolyether compound (b-1), as described below. The perfluoropolyether compound (b-1) is typically linear. In certain embodiments, the perfluoropolyether compound (b-1) has at least one terminal hydroxy group, alternatively two or more terminal hydroxyl groups. When the perfluoropolyether compound (b-1) contains two or more terminal hydroxyl groups, the hydroxyl groups may be located at the same or opposite terminals of the perfluoropolyether compound (b-1). As described above, the terminal hydroxyl group may constitute the active hydrogen of the perfluoropolyether compound (b-1).

The perfluoropolyether compound (b-1) typically has a molecular weight of from 200 to 10,000,000, alternatively from 500 to 1,000,000, alternatively from 1,000 to 10,000, alternatively from 1,000 to 5,000, grams per mole (g/mol).

Specific examples of the perfluoropolyether compound (b-1) include those disclosed in U.S. Pat. No. 6,906,115 B2, the disclosure of which is incorporated by reference herein in its entirety. In certain embodiments, the perfluoropolyether compound (b-1) includes the perfluoropolyether segment, which has a number average molecular weight of from 1,000 to 100,000, alternatively from 1,500 to 10,000 g/mol.

As set forth above, the monomeric compound (b-2) has a functional group other than and in addition to the active hydrogen atom. Typically, the functional group of the monomeric compound (b-2) is a self-crosslinking functional group. Self-crosslinking functional groups are those that are capable of undergoing a crosslinking reaction with one another, even though the self-crosslinking functional groups are the same. Specific examples of self-crosslinking functional group include radical polymerization reactive functional groups, cationic polymerization reactive functional groups, and functional groups only capable of optical crosslinking. Examples of radical polymerization reactive functional groups that are self-crosslinking include functional groups containing ethylenic unsaturation (e.g. a double bond (C=C)). Examples of cationic polymerization reactive functional groups that are self-crosslinking include cationic polymerization reactive ethylenic unsaturation, epoxy groups, oxetanyl groups, and silicon compounds containing alkoxysilyl groups or silanol groups. Examples functional groups only capable of optical crosslinking include photodimerisable functional groups of vinylcinnamic acid.

In certain embodiments, the monomeric compound (b-2) comprises a (meth)acrylate ester or vinyl monomer. In these embodiments, the monomeric compound (b-2) may have from 2 to 30, alternatively from 3 to 20, carbon atoms.

Specific examples of the monomeric compound (b-2) include hydroxyethyl (meth)acrylate; hydroxypropyl (meth)acrylate; hydroxybutyl (meth)acrylate; aminoethyl (meth)acrylate; hydroxy-3-phenoxypropyl (meth)acrylate); allyl alcohol; styryl phenol; and combinations thereof.

In certain embodiments, the fluoro-substituted compound is formed by reacting (a) and (b-1) to form a reaction intermediate and then reacting the reaction intermediate and (b-2) to form the fluoro-substituted compound.

Additional aspects of this particular fluoro-substituted compound, including methods of its preparation, are disclosed in U.S. Pat. No. 8,609,742 B2, which is incorporated by reference herein in its entirety.

In certain embodiments, the curable composition further comprises a reinforcing filler. The reinforcing filler is utilized to provide increased hardness and scratch resistance to a cured product formed from the curable composition. The reinforcing filler generally comprises silica. The silica may be any type of silica, e.g. the silica may be fumed silica, precipitated silica, colloidal silica, etc. Typically, the reinforcing filler comprises colloidal silica.

Colloidal silica comprises a mixture or suspension of silica (i.e., silica particles) in a vehicle. The vehicle may alternatively be referred to as a dispersion medium. The silica particles of the colloidal silica are typically amorphous and nonporous.

The vehicle of the colloidal silica typically has a moderately low boiling point temperature for removal of the vehicle from the curable composition (and colloidal silica). For example, the vehicle typically has a boiling point temperature at atmospheric pressure (i.e., 1 atm) of from 30 to 200, alternatively from 40 to 150, ° C.

Suitable vehicles for the colloidal silica include polar and non-polar vehicles. Specific examples of such vehicles include water; alcohols, such as methanol, ethanol, isopropanol, n-butanol, and 2-methylpropanol; glycerol esters, such as glyceryl triacetate (triacetin), glyceryl tripropionate (tripropionin), and glyceryl tributyrate (tributyrin); polyglycols, such as polyethylene glycols and polypropylene glycols; cellosolves, such as methyl cellosolve, ethyl cellosolve and butyl cellosolve; dimethylacetamide; aromatics, such as toluene and xylene; acetates, such as methyl acetate; ethyl acetate; butyl acetate; ketones, such as methyl isobutyl ketone; acetic acid; and acetone. In specific embodiments, the vehicle of the colloidal silica is selected from water and an alcohol. The colloidal silica may alternatively be referred to as a colloidal silica dispersion. Two or more different vehicles may be utilized, although such vehicles are generally compatible with one another such that the colloidal silica is homogenous. The vehicle of the colloidal silica is typically present in the colloidal silica in a concentration of from, for example, 10 to 70 weight percent based on the total weight of the colloidal silica.

The silica particles of the colloidal silica typically have an average particle size less than 200 nanometers (nm), e.g. from 1 to 100, alternatively from 1 to 50, nm.

The silica particles of the colloidal silica may be pure silicon dioxide, or may comprise a nominal amount of impurities, such as $Al_2O_3$, ZnO, and/or cations such as $Na^+$, $K^+$, $Ca^{++}$, $Mg^{++}$, etc.

The colloidal silica may optionally be surface treated, e.g. with a filler treating agent. The colloidal silica may be surface treated prior to incorporation into the curable composition or may be surface treated in situ.

The amount of the filler treating agent utilized to treat the colloidal silica may vary depending on various factors, such as whether the colloidal silica is treated with the filler treating agent in situ or pretreated before being incorporated into the curable composition.

The filler treating agent may comprise a silane, such as an alkoxysilane; an alkoxy-functional oligosiloxane; a cyclic polyorganosiloxane; a hydroxyl-functional oligosiloxane, such as a dimethyl siloxane; methyl phenyl siloxane; a stearate; or a fatty acid.

Alkoxysilanes suitable for the filler treating agent are exemplified by hexyltrimethoxysilane, octyltriethoxysilane, decyltrimethoxysilane, dodecyltrimethoxysilane, tetradecyltrimethoxysilane, phenyltrimethoxysilane, phenylethyltrimethoxysilane, octadecyltrimethoxysilane, octadecyltriethoxysilane, and a combination thereof.

Alternatively, the alkoxysilane may include an ethylenically unsaturated group. The ethylenically unsaturated group may comprise a carbon-carbon double bond, a carbon-carbon triple bond, or combinations thereof. In these embodiments, the alkoxysilane may be represented by general formula $R^3{}_{d'}ASi(OR^4)_{3-d'}$. In this general formula, $R^3$ is a substituted or unsubstituted monovalent hydrocarbon group which contains no aliphatic unsaturated bond. Specific examples thereof include alkyl groups, aryl groups, and fluoroalkyl groups. $R^4$ is an alkyl group, typically having from 1 to 10 carbon atoms. A is a monovalent organic group having an aliphatic unsaturated bond. Specific examples of A include acryl group-containing organic groups, such as a methacryloxy group, an acryloxy group, a 3-(methacryloxy) propyl group and a 3-(acryloxy)propyl group; alkenyl groups, such as a vinyl group, a hexenyl group and an allyl group; a styryl group and a vinyl ether group. Subscript d' is 0 or 1.

Specific examples of the alkoxysilane having an ethylenically unsaturated group include 3-(methacryloxy)propyltrimethoxysilane, 3-(methacryloxy)propyltriethoxysilane, 3-(methacryloxy) propylmethyldimethoxysilane, 3-(acryloxy)propyltrimethoxysilane, vinyltrimethoxysilane, vinyltriethoxysilane, methylvinyldimethoxysilane and allyltriethoxysilane.

Alkoxy-functional oligosiloxanes may alternatively be used as the filler treating agent. Alkoxy-functional oligosiloxanes and methods for their preparation are known in the art. For example, suitable alkoxy-functional oligosiloxanes include those of the formula $(R^5O)_{e'}Si(OSiR^5{}_2R^6)_{(4-e')}$. In this formula, subscript e' is 1, 2, or 3, alternatively 3. Each $R^5$ is independently selected from saturated and unsaturated hydrocarbyl groups having from 1 to 10 carbon atoms. Each $R^6$ is a saturated or unsaturated hydrocarbyl group.

Alternatively, silazanes may be utilized as the filler treating agent, either discretely or in combination with, for example, alkoxysilanes.

Alternatively still, the filler treating agent may an organosilicon compound. Examples of organosilicon compounds include, but are not limited to, organochlorosilanes such as methyltrichlorosilane, dimethyldichlorosilane, and trimethyl monochlorosilane; organosiloxanes such as hydroxy-endblocked dimethylsiloxane oligomer, hexamethyldisiloxane, and tetramethyldivinyldisiloxane; organosilazanes such as hexamethyldisilazane and hexamethylcyclotrisilazane; and organoalkoxysilanes such as methyltrimethoxysilane, vinyltrimethoxysilane, vinyltriethoxysilane, 3-glycidoxypropyltrimethoxysilane, and 3-methacryloxypropyltrimethoxysilane. Examples of stearates include calcium stearate. Examples of fatty acids include stearic acid, oleic acid, palmitic acid, tallow, coconut oil, and combinations thereof.

A residual amount of the filler treating agent may be present in the curable composition, e.g. as a discrete component separate from the colloidal silica.

Alternatively, the silica particles of the colloidal silica need not be surface treated with the treating agent. In these embodiments, the colloidal silica may be referred to as an unmodified colloidal silica. The unmodified colloidal silica is typically in the form of an acidic or basic dispersion.

If desired, an additional filler may be present in the curable composition, e.g. a filler other than colloidal silica. Examples thereof include alumina, calcium carbonate (e.g., fumed, fused, ground, and/or precipitated), diatomaceous earth, talc, zinc oxide, chopped fiber such as chopped KEVLAR®, onyx, beryllium oxide, zinc oxide, aluminum nitride, boron nitride, silicon carbide, tungsten carbide; and combinations thereof.

The curable composition may optionally further comprise (i) water; (ii) a carrier vehicle other than water; or (iii) water and a carrier vehicle other than water.

If utilized, water is present in the curable composition for hydrolysis of the reinforcing filler. For example, as known in the art, the silica particles of the colloidal silica may include silanol groups at a surface of the silica particles. Water may be utilized as the vehicle of the colloidal silica, in which case water is not needed as a discrete component in the curable composition. Further, if the colloidal silica is already surface treated, water is similarly not typically utilized.

The carrier vehicle is typically an alcohol-containing vehicle. The alcohol-containing vehicle may comprise, consist essentially of, or consist of an alcohol. The alcohol-containing vehicle is for dispersing the components of the curable composition. In certain embodiments, the alcohol-containing vehicle solubilizes the components of the curable composition, in which case the alcohol-containing vehicle may be referred to as an alcohol-containing solvent.

Specific examples of alcohols suitable for the alcohol-containing vehicle include methanol, ethanol, isopropyl alcohol, butanol, isobutyl alcohol, ethylene glycol, diethylene glycol, triethylene glycol, ethylene glycol monomethyl ether, diethylene glycol monomethyl ether, triethylene glycol monomethyl ether, and combinations thereof. When the alcohol-containing vehicle comprises or consists essentially of the alcohol, the alcohol-containing vehicle may further comprise an additional organic vehicle. Specific examples thereof include acetone, methyl ethyl ketone, methyl isobutyl ketone, or similar ketones; toluene, xylene, or similar aromatic hydrocarbons; hexane, octane, heptane, or similar aliphatic hydrocarbons; chloroform, methylene chloride, trichloroethylene, carbon tetrachloride, or similar organic chlorine-containing solvents; ethyl acetate, butyl acetate, isobutyl acetate, or a similar fatty acid ester. When the alcohol-containing vehicle comprises the additional organic vehicle, the alcohol-containing vehicle typically comprises the alcohol in an amount of from 10 to 90, alternatively from 30 to 70, weight percent based on the total weight of the alcohol-containing vehicle, with the balance of the alcohol-containing vehicle being the additional organic vehicle.

In various embodiments, the curable composition may additionally comprise a photopolymerization initiator. The photopolymerization initiator is most commonly utilized if the curable composition is to be cured via irradiation with electromagnetic radiation. The photopolymerization initiator may be selected from known compounds capable of generating a radical under irradiation with electromagnetic radiation, such as organic peroxides, carbonyl compounds, organic sulfur compounds and/or azo compounds.

Specific examples of suitable photopolymerization initiators include acetophenone, propiophenone, benzophenone, xanthol, fluorine, benzaldehyde, anthraquinone, triphenylamine, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxy ketal, 2-chlorothioxanthone, diethylacetophenone, 1-hydroxycyclohexyl phenyl ketone, 2-methyl[4-(methylthio)phenyl]2-morpholino-1-propanone, 2,2-dimethoxy-2-phenylacetophenone, diethoxyacetophenone, and combinations thereof.

If utilized, the photopolymerization initiator is typically present in the curable composition in an amount of from 1 to 30, alternatively 1 to 20, parts by weight, based on 100 parts by weight of the polyfunctional acrylate.

If desired, the curable composition may further comprise a silane compound (H). Examples thereof include tetraalkoxysilanes, such as tetramethoxysilane, tetraethoxysilane and tetraisopropoxysilane; and alkylalkoxysilanes such as methyltrimethoxysilane, methyltriethoxysilane, methyltriisopropoxysilane, ethyltrimethoxysilane, ethyltriethoxysilane and ethyltriisopropoxysilane. The silane compound may be utilized as a discrete component or, as another example, to form a silsesquioxane in the curable composition.

Additional examples of additives that may be present in the curable composition include antioxidants; thickeners; surfactants, such as leveling agents, defoamers, sedimentation inhibitors, dispersing agents, antistatic agents and antifog additives; ultraviolet absorbers; colorants, such as various pigments and dyes; butylated hydroxytoluene (BHT); phenothiazine (PTZ); organopolysiloxanes; and combinations thereof.

The curable composition may be prepared via various methods involving the combination of the various components of the curable composition. In certain embodiments, the colloidal silica is surface treated prior to incorporation into the curable composition. The components may individually or collectively be heated before, during, or after the preparation of the curable composition.

The curable composition may be utilized in a variety of end uses and applications. Most typically, the curable composition is utilized to form a cured product. The cured product may be in the form of a fiber, a coating, a layer, a film, a composite, an article, etc.

The invention additionally provides a cured product formed from the curable composition and a method of forming the cured product with the curable composition. The cured product and method of forming the cured product are described together below.

The method of forming the cured product comprises applying the curable composition on a substrate. The method further comprises curing the curable composition on the substrate so as to form the cured product on the substrate. For example, the method of forming the cured product comprises applying the curable composition on the substrate to form a wet layer thereof on the substrate. The method further comprises curing the wet layer to form the cured product.

The substrate is not limited and may be any substrate upon which it is desirable to form the cured product. For example, the substrate may comprise an electronic article, an optical article, consumer appliances and components, automotive bodies and components, polymeric articles, etc. The substrate may have any shape or configuration.

Examples of electronic articles typically include those having electronic displays, such as liquid crystal displays (LCDs), light-emitting diode (LED) displays, organic light emitting diode (OLED) displays, plasma displays, etc. These electronic displays are often utilized in various electronic devices, such as computer monitors, televisions, smart phones, global positioning systems (GPS), music players, remote controls, hand-held video games, portable readers, automobile display panels, etc.

Thus, the invention provides an article comprising the cured product and a substrate, the cured product being disposed on the substrate. The article may comprise an electronic article, an optical article, consumer appliance or a component thereof, an automotive body or a component thereof, or a polymeric article. The article may comprise a sensor.

In some embodiments the article may be a sensor. As used herein, a sensor is a device that detects external events or changes in quantities and provides an appropriate output. To illustrate, the sensor may be a thermocouple that detects temperature or changes in temperature and provides an appropriate voltage output. The sensor may comprise a detecting surface in contact with an external environment and configured for detecting the external events or changes in quantities. The detecting surface may be in communication with a signal processor for converting the detected external events or changes in quantities into the appropriate output. The sensor's output may be in the form of an electrical and/or optical signal. The sensor may be a physical sensor, chemical sensor, or biosensor. The physical sensor may be configured for measuring temperature, pressure, light intensity or wavelength, sound intensity or frequency, or electrical signals. The chemical sensor may be configured for measuring chemical compositions such as detecting presence of or measuring concentration of analytes such as water, molecular oxygen or ozone, carbon monoxide, carbon dioxide, nitrogen oxides, sulfur oxides, hydrogen sulfide, or chemical warfare agents. The biosensor may be configured for detecting presence of or measuring extent of enzymatic activity in vitro, detecting presence of or measuring concentration of a drug or metabolite ex vivo, or detecting or recognizing skin patterns (bioprint) or features in vivo.

In some embodiments the sensor is a biosensor, and the biosensor is a bioprint sensor. The bioprint being detected or measured may be any distinguishing skin feature of animal anatomy, including human anatomy, such as a fingerprint (including thumbprint), palmprint, footprint, earprint, pawprint, or the like. The bioprint sensor may be optical based, ultrasonic based, thermal line based, pressure sensitive based, or capacitance based. The bioprint sensor may capture a digital image of a skin pattern using visible light (optical based), high frequency sound waves (ultrasonic based), temperature variations across grooves, bumps and ridges (thermal line based), pressure differences between grooves, bumps and ridges (pressure sensitive based), or differences between grooves, bumps and ridges in subdermal skin layer conductivity (capacitance based). The bioprint sensor may comprise a sensor array of sensor pixels, wherein each sensor pixel is configured to detect an external event or change in quantity at its location in the sensor array, and produce an appropriate output for that location. The bioprint sensor may map outputs from each sensor pixel in the sensor array and thereby produce a composite image in the form of a visual or electronic image of the bioprint. The composite image may depict the bioprint in two-dimensions or three-dimensions. For example, a fingerprint comprising bumps, ridges and grooves (valleys between ridges) may be imaged by a capacitance-based fingerprint sensor, which may produce a composite image of the fingerprint from a sensor array of capacitance sensor pixels disposed over different locations on bumps, ridges or grooves of the fingerprint. The composite image may be a two-dimensional bump/ridge pattern or a three-dimensional topographical image.

In some embodiments the sensor is a (human) fingerprint sensor. The fingerprint sensor may be optical based, ultrasonic based, thermal line based, pressure sensitive based, or capacitance based. In some embodiments the fingerprint sensor may be an optical fingerprint sensor, alternatively a capacitance-based fingerprint sensor. The fingerprint sensor may be part of an electronic device in need of fingerprint sensing, such as personal electronic devices that employ biometric scanners such as personal computers, smartphones, computing tablets, electronic readers, and the like.

Accordingly, the invention provides the sensor or an electronic device comprising the sensor, wherein the detecting surface of the sensor has coated thereon a film of the inventive cured product formed from the inventive curable composition. The invention also provides a method of forming the film of the cured product on the detecting surface of the sensor, the method comprising applying the curable composition to a detecting surface of the sensor to form a film of the curable composition on the detecting surface of the sensor, and curing the curable composition of the film to give the film of the cured product on the detecting surface of the sensor. In some embodiments the sensor is the biosensor, alternatively the bioprint sensor, alternatively the fingerprint sensor, alternatively the optical fingerprint sensor, alternatively the capacitance-based fingerprint sensor.

The film is oleophobic (e.g., repels skin oils) and hydrophobic (i.e., repels water). As such the film may enable a fingerprint sensor to function even if the finger being used is wet (e.g., as indicated by testing with artificial sweat) or excessively oily (e.g., as indicated by testing with sebum). The film of the inventive cured product on the detecting surface of the sensor may be thick enough to provide oleophobic and hydrophobic coating effects even after repeated use of the sensor (i.e., the film is not so thin that the film would be easily wiped off under normal use). The film may be a monolayer film, alternatively a multilayer film. The film may also be thin enough for the particular type of sensor (e.g., optical based, ultrasonic based, thermal line based, pressure sensitive based, or capacitance based) that it does not prevent the sensor from detecting the external events or changes in quantities. In some embodiments the film has a thickness of from 5 micrometers ($\mu m$) to 100 $\mu m$.

The extent to which a suitable film for the sensor is oleophobic may be determined by applying a quantity of hexadecane on the surface of the detector element of the sensor, and then measuring a static hexadecane contact angle, as described later. The extent to which a suitable coating composition is hydrophobic may be determined by applying a quantity of deionized water on the surface of the detector element of the sensor, and then measuring a water contact angle, as described later. As such, the film that is both oleophobic and hydrophobic may have a Water Contact Angle >100° and a Hexadecane Contact Angle >50°.

FIG. 1a (top left) shows a photographic image of a regular (not wet) fingerprint on a coated plastic board, wherein the coating is a film of or comprising the inventive cured product of one of the Examples described later. FIG. 1b (top right) shows a photographic image of a regular (not wet) fingerprint on an uncoated plastic board. FIG. 1c (bottom left) shows a photographic image of a wet (water) fingerprint on a coated plastic board, wherein the coating is as used for FIG. 1a. FIG. 1d (bottom right) shows a photographic image of a wet (water) fingerprint on an uncoated plastic board. As can be seen by comparing FIG. 1a with FIG. 1b, the inventive film increases the ridge definition and fidelity of the fingerprint image of a regular (not wet or excessively oily) fingerprint as compared to a fingerprint on a plastic board without any oleophobic and hydrophobic film thereon. As can be seen by comparing FIG. 1b with FIG. 1d, the presence of water on a finger significantly degrades the clarity and fidelity of the fingerprint image compared to that of a regular (not wet or excessively oily) fingerprint, wherein the fingerprints were obtained from an uncoated plastic board, i.e., without any oleophobic and hydrophobic film thereon. As can be seen by comparing FIG. 1c with FIG. 1d, the inventive film increases the ridge definition and fidelity of the fingerprint image of a wet (water) fingerprint obtained with the coated plastic board as compared to an uncoated plastic board without any oleophobic and hydrophobic film thereon.

Alternatively, instead of, or in addition to, the film of the inventive cured product, the oleophobic and hydrophobic film disposed on the detecting surface of the sensor may any other oleophobic and hydrophobic coating composition known in the art. Examples of suitable oleophobic and hydrophobic coating compositions are compositions comprising a matrix material and an oleophobic and hydrophobic additive. The matrix material may comprise an organic polymer, any organopolysiloxane, or a combination thereof. The oleophobic and hydrophobic additive may comprise a fluoro-substituted compound. The fluoro-substituted compound may be perfluorinated, alternatively polyfluorinated. Perfluorinated means completely fluorinated (i.e., all C—H groups have been formally replaced with C—F groups) and polyfluorinated means not fully fluorinated (i.e., contains two or more C—F groups and at least some C—H groups). The polyfluorinated compound may be configured in any suitable manner such as being a homogeneous macromolecule that contains a mixture of C—F and C—H groups or a segmented macromolecule that comprises at least two segments, one of which is perfluorinated and another one of which is free of fluorine atoms. The fluoro-substituted compound may be a fluoro-substituted organic polymer, a fluoro-substituted organopolysiloxane, or a hybrid polymer comprising a combination of a segment that is a fluoro-substituted organic polymer and a segment that is a fluoro-substituted organopolysiloxane.

In some embodiments the fluoro-substituted compound comprises a polyfluoropolyether segment and at least one fluorine-free segment such as a organopolysiloxane segment, a poly(meth)acrylic acid segment, or a combination thereof. The perfluoropolyether segment may include any two or more of the following units: —($CF_2$)—, —($CF(CF_3)$ $CF_2O$)—, —($CF_2CF(CF_3)O$)—, —($CF(CF_3)O$)—, —($CF(CF_3)$—$CF_2$)—, —($CF_2$—$CF(CF_3)$)—, and —($CF(CF_3)$)—. Such units may be present in any order within the perfluoropolyether segment, such as randomized or in block form. Each unit may independently be present two or more times in the perfluoropolyether segment. Generally, the perfluoropolyether segment is free from oxygen-oxygen bonds, with oxygen generally being present as a heteroatom between adjacent carbon atoms so as to form an ether linkage. The perfluoropolyether segment is typically a terminal in the fluorinated compound, in which case the terminal group of the perfluoropolyether segment may be a $CF_3$ group. When the fluoro-substituted compound comprises the perfluoropolyether segment, the perfluoropolyether segment comprises moieties having the general formula (1): —($C_3F_6O$)$_x$—($C_2F_4O$)$_y$—($CF_2$)$_z$— (1); wherein subscripts x, y, and z are each independently selected from 0 and an integer from 1 to 40, with the proviso that x, y, and z are not simultaneously 0. If x and y are both 0, at least one other perfluoroether moiety is present in the perfluoropolyether segment. Typically, x, y, and z are each independently selected from integers from 1 to 40. The moieties represented by subscripts x and y may be independently branched or linear. For example, ($C_3F_6O$) may independently be represented by $CF_2CF_2CF_2O$, $CF(CF_3)CF_2O$ or $CF_2CF(CF_3)O$.

The other oleophobic and hydrophobic coating composition may be an organopolysiloxane that typically includes silicon-bonded groups other than those including amino-substitution. Such silicon-bonded groups are generally monovalent and may be exemplified by alkyl groups, aryl groups, alkoxy groups, and/or hydroxyl groups. The organopolysiloxane typically has a degree of polymerization of from 2 to 1000, alternatively from 2 to 500, alternatively from 2 to 300.

In some embodiments the other oleophobic and hydrophobic coating composition is the surface treatment composition described in US 2013/0004780 A1, which surface treatment composition and processes of producing same are hereby incorporated by reference herein, especially the surface treatment composition and process of producing same described in paragraph [0011] et seq.; and more especially the surface treatment composition described in claims 1-7 and the process of producing same described in claims 8-14.

As introduced above, the substrate may also be a metal article, such as consumer appliances and components. Exemplary articles include a dishwasher, a stove, a microwave, a refrigerator, a freezer, etc, typically having a glossy metal appearance, such as stainless steel, brushed nickel, aluminum, etc.

Alternatively, the substrate may be a vehicle body or component such as an automotive body or component. For example, the curable composition may be applied directly on a top coat of an automobile body to form the layer, which imparts the automobile body with a glossy appearance, which is aesthetically pleasing and resists stains, such as dirt, etc., as well as smudges from fingerprints.

Examples of suitable optical articles include inorganic materials, such as glass plates, glass plates comprising an inorganic layer, ceramics, and the like. Additional examples of suitable optical articles include organic materials, such as transparent plastic materials and transparent plastic materials comprising an inorganic layer, etc. Specific examples of optical articles include antireflective films, optical filters, optical lenses, eyeglass lenses, beam splitters, prisms, mirrors, etc.

Specific examples of organic materials and/or polymeric articles include polyolefins (e.g. polyethylene, polypropylene, etc.), polycycloolefins, polyesters (e.g. polyethylene terephthalate, polyethylene naphthalate, etc.), polyamides (e.g. nylon 6, nylon 66, etc.), polystyrene, polyvinyl chloride, polyimides, polyvinyl alcohol, ethylene vinyl alcohol, acrylics (e.g. polymethyl methacrylate), celluloses (e.g. triacetylcellulose, diacetylcellulose, cellophane, etc.), or copolymers of such organic polymers. It is to be appreciated that these materials may be utilized in ophthalmic elements. Non-limiting examples of ophthalmic elements include corrective and non-corrective lenses, including single vision or multi-vision lenses like bifocal, trifocal and progressive lenses, which may be either segmented or non-segmented, as well as other elements used to correct, protect, or enhance vision, including without limitation contact lenses, intraocular lenses, magnifying lenses and protective lenses or visors. Preferred material for ophthalmic elements comprises one or more polymers selected from polycarbonates, polyamides, polyimides, polysulfones, polyethylene terephthalate and polycarbonate copolymers, polyolefins, especially polynorbornenes, diethylene glycol-bis(allyl carbonate) polymers—known as CR39—and copolymers, (meth)acrylic polymers and copolymers, especially (meth) acrylic polymers and copolymers derived from bisphenol A, thio(meth)acrylic polymers and copolymers, urethane and thiourethane polymers and copolymers, epoxy polymers and copolymers, and episulfide polymers and copolymers.

The substrate may comprise any of the materials described above while being different from the particular articles recited herein. For example, the substrate may comprise a metal or alloy that is not part of a consumer appliance or vehicle body.

In addition to the articles/substrates described above, the curable composition may be applied to other substrates, such as window members for automobiles or airplanes, thus providing advanced functionality.

Alternatively still, the substrate may comprise cement, stone, paper, cardboard, ceramic, etc.

Alternatively or in addition, the substrate may comprise an antireflective coating. In these embodiments, the antireflective coating may include one or more layers of material disposed on an underlying substrate. The antireflective coating generally has a lesser refractive index than the underlying substrate. The antireflective coating may be multi-layer. Multi-layer antireflective coatings include two or more layers of dielectric material on the underlying substrate, wherein at least one layer has a refractive index higher than the refractive index of the underlying substrate. Such multi-layer antireflective coatings are often referred to as antireflective film stacks.

The antireflective coating may be formed from a wide variety of materials. In certain embodiments, the antireflective coating comprises a thin metal oxide film, such as a thin sputter coated metal oxide film. Alternatively, the thin metal oxide film may be formed via thermal evaporation. "Metal oxides," as used herein, include oxides of single metals (including metalloids) as well as oxides of metal alloys. One example of a metal oxide is a silicon oxide, which may be depleted of oxygen (i.e., wherein the amount of oxygen in the oxide is less than the stoichiometric amount). Additional suitable metal oxides include oxides of tin, titanium, niobium, zinc, zirconium, tantalum, yttrium, aluminum, cerium, tungsten, bismuth, indium, and mixtures thereof. Specific examples include $SiO_2$, $SnO_2$, $TiO_2$, $Nb_2O_5$, $ZnO$, $ZrO_2$, $Ta_2O_5$, $Y_2O_3$, $Al_2O_3$, $CeO_2$, $WO_3$, $Bi_2O$, $In_2O_3$, and ITO (indium tin oxide), as well as combinations and alternating layers thereof.

If desired, the underlying substrate may have a primed surface prior to deposition of the antireflective coating. For example, the primed surface may be formed by the application of a chemical primer layer, such as an acrylic layer, or from chemical etching, electronic beam irradiation, corona treatment, plasma etching, or co-extrusion of adhesion promoting layers. Such primed substrates are commercially available.

The method by which the curable composition is applied on the substrate may vary. For example, in certain embodiments, the step of applying the curable composition on the substrate uses a wet coating application method. Specific examples of wet coating application methods suitable for the method include dip coating, spin coating, flow coating, spray coating, roll coating, gravure coating, sputtering, slot coating, and combinations thereof. The alcohol-containing vehicle, along with any other vehicles or solvents present in the curable composition and wet layer, may be removed from the wet layer via heating or other known methods.

The curable composition may be applied on the substrate to any thickness to provide the desired level of water, oil, stain, and soil repellency. In certain embodiments, the cured product may alternatively be referred to as a layer or film, although the cured product may have any shape or form other than that associated with layers or films. In these embodiments, the cured product has a thickness of from greater than 0 to 12, alternatively from greater than 0 to 10, alternatively from greater than 0 to 5, micrometers (μm). In certain embodiments, the cured product has a thickness of at least 15, alternatively at least 20, alternatively at least 30, Angstroms, with the upper limit in such embodiments being 20 μm.

The curable composition, as well as the wet layer formed therefrom, can be rapidly cured by being irradiated with active-energy rays (i.e., high-energy rays). The active-energy rays may comprise ultraviolet rays, electron beams, or other electromagnetic waves or radiation. The use of ultraviolet rays is preferable from the point of view of low cost and high stability. A source of ultraviolet radiation may comprise a high-pressure mercury lamp, medium-pressure mercury lamp, Xe—Hg lamp, or a deep UV lamp.

The step of curing the wet layer generally comprises exposing the wet layer to radiation at a dosage sufficient to cure at least a portion, alternatively the entirety, of the wet layer. The dosage of radiation for curing the wet layer is typically from 10 to 8000 milliJoules per centimeter squared ($mJ/cm^2$). In certain embodiments, heating is used in conjunction with irradiation for curing the wet layer. For example, the wet layer may be heated before, during, and/or after irradiating the wet layer with active-energy rays. While active energy-rays generally initiate curing of the curable composition, residual amounts of the alcohol-containing vehicle or any other vehicles and/or solvents may be present in the wet layer, which may be volatilized and driven off by heating. Typical heating temperatures are in the range of from 50 to 200° C. Curing the wet layer provides the cured product.

The cured product includes a host matrix with the reinforcing filler being dispersed in the host matrix. The host matrix is formed from a reaction of the polyfunctional acrylate, the fluoro-substituted compound having an aliphatic unsaturated bond, and the organopolysiloxane having at least one acrylate group. The reinforcing filler is generally homogenously dispersed in the host matrix of the cured product, although the reinforcing filler may be heterogeneously dispersed in the host matrix or otherwise in varying concentrations across any dimension of the cured product.

The cured product has excellent physical properties and is suitable for use as protective coatings on a variety of substrates. For example, the cured product has excellent (i.e., high) hardness, durability, adhesion to the substrate, and resistance to staining, smudging, and scratching. In certain embodiments, the cured product has a water contact angle of at least 90, alternatively at least 100, alternatively at least 105, alternatively at least 108, alternatively at least 110, degrees (°). In these embodiments, the upper limit is typically 120 degrees (°). The water contact angle of the cured product is typically within this range even after subjecting the cured product to an abrasion test, which illustrates the excellent durability of the cured product. For example, for cured products having a lesser durability, the water contact angle decreases after abrasion, which generally indicates that the cured product has at least partially deteriorated.

In these embodiments, the cured product also typically has a sliding (kinetic) coefficient of friction (μ) of from greater than 0 to less than 0.2, alternatively from greater than 0 to less than 0.15, alternatively from greater than 0 to less than 0.125, alternatively from greater than 0 to less than 0.10. Although coefficient of friction is unitless, it is often represented by μ.

For example, sliding (kinetic) coefficient of friction may be measured by disposing an object having a determined surface area and mass onto the cured product with a select material (e.g. a standard piece of legal paper) between the object and the cured product. A force is then applied perpendicular to gravitational force to slide the object across the cured product for a predetermined distance, which allows for a calculation of the sliding coefficient of friction of the cured product.

Aspect 1. A fluorinated compound having the general formula (1):

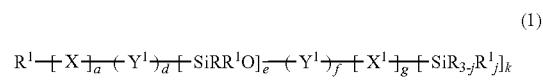

(1)

wherein each R is an independently selected substituted or unsubstituted hydrocarbyl group; each $R^1$ is independently selected from R, —Y—$R_f$, and a (meth)acrylate functional group; $R_f$ is a fluoro-substituted group; Y is a covalent bond or a bivalent linking group; each $Y^1$ is independently a covalent bond or a bivalent linking group; X has the general formula (2):

(2)

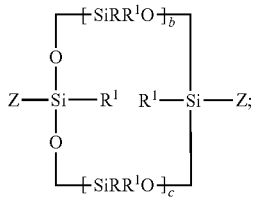

$X^1$ has the general formula (3):

(3)

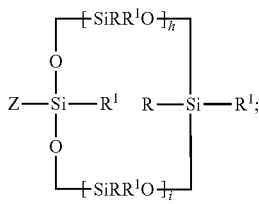

Z is a covalent bond; subscripts a and g are each 0 or 1, with the proviso that when a is 1, g is 1; subscripts b and c are each 0 or an integer from 1 to 10, with the proviso that when a is 1, at least one of b and c is at least 1; subscripts d and f are each independently 0 or 1; subscript e is 0 or an integer from 1 to 10; subscripts h and i are each 0 or an integer from 1 to 10, with the proviso that when g is 1, at least one of h and i is at least 1; subscript j is 0 or an integer from 1 to 3; and subscript k is 0 or 1, with the provisos that k is 1 when a and g are each 0 and k is 0 when g is 1; with the proviso that a, e, and g are not simultaneously 0; wherein at least one $R^1$ of said fluorinated compound is a (meth)acrylate functional group and at least one $R^1$ of said fluorinated compound is represented by $-Y-R_f$.

Aspect 2. The fluorinated compound of aspect 1 wherein subscripts a, d, f, and g are each 0, subscript e is an integer from 1 to 10, and subscript k is 1 such that said fluorinated compound has the general formula (4):

(4)

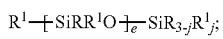

wherein R, $R^1$, and subscripts e and j are each defined in aspect 1.

Aspect 3. The fluorinated compound of aspect 1 wherein subscripts a and g are each 1 and subscript k is 0 such that said fluorinated compound has the general formula (5):

wherein R, $R^1$, Z, $Y^1$, and subscripts b, c, d, e, f, h, and i are each defined in aspect 1.

Aspect 4. The fluorinated compound of aspect 1 wherein subscripts a, d, e, f, and k are each 0 such that said fluorinated compound has the general formula (6):

(6)

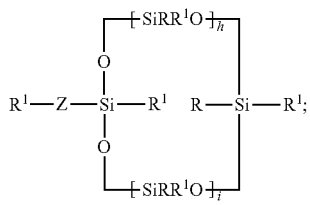

wherein R, $R^1$, Z, and subscripts h and i are each defined in aspect 1.

Aspect 5. The fluorinated compound of aspects 1 or 3 wherein each $Y^1$ is independently said bivalent linking group, said bivalent linking group being independently selected from the group of a hydrocarbylene group, a heterohydrocarbylene group, or an organoheterylene group.

Aspect 6. The fluorinated compound of any one preceding aspect wherein $R_f$: (i) is partially fluorinated; (ii) comprises a perfluoropolyether segment; or (iii) both (i) and (ii).

Aspect 7. The fluorinated compound of aspect 6 wherein $R_f$ comprises said perfluoropolyether segment, said perfluoropolyether segment comprising moieties of general formula (7): $-(C_3F_6O)_x-(C_2F_4O)_y-(CF_2)_z-$ (7); wherein subscripts x, y, and z are each independently selected from 0 and an integer from 1 to 40, with the proviso that x, y, and z are not simultaneously 0.

Aspect 8. The fluorinated compound of any one preceding aspect wherein Y is said bivalent linking group, said bivalent group represented by Y having the general formula (8): $-(CH_2)_m-O-(CH_2)_n-$ (8); wherein m and n are each integers independently from 1 to 5.

Aspect 9. The fluorinated compound of any one preceding aspect comprising two or more (meth)acrylate functional groups represented by $R^1$.

Aspect 10. The fluorinated compound of any one preceding aspect wherein one $R^1$ is represented by $-Y-R_f$.

Aspect 11. A curable composition, comprising: said fluorinated compound of any one of aspects 1-10; and a polyfunctional acrylate.

Aspect 12. The curable composition of aspect 11 further comprising: a fluoro-substituted compound different from the fluorinated compound and having an aliphatic unsaturated bond; and a reinforcing filler.

(5)

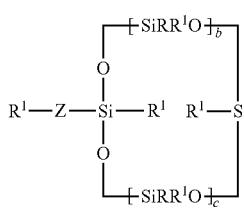 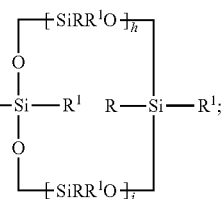

Aspect 13. A cured product formed by curing the curable composition of one of aspects 11 and 12.

Aspect 14. An article comprising the cured product of aspect 13 and a substrate, the cured product being disposed on the substrate.

Aspect 15. The article of aspect 14 comprising an electronic article, an optical article, consumer appliance or a component thereof, an automotive body or a component thereof, or a polymeric article.

Aspect 16. The article of aspect 15 comprising a sensor.

The appended claims are not limited to expressed and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the invention independently and collectively fall within the scope of the appended claims, and describe and contemplate all ranges including whole and/or fractional values therein, even if such values are not expressly written herein. One of skill in the art readily recognizes that the enumerated ranges and subranges sufficiently describe and enable various embodiments of the invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

EXAMPLES

Initial Preparation Examples 1-9

In Initial Preparation Examples 1-9, precursor compounds for preparing fluorinated compounds in accordance with the invention are prepared. The precursor compounds prepared in Initial Preparation Examples 1-9 are utilized in Preparation Examples 1-9 below, respectively, to prepare the fluorinated compounds.

Initial Preparation Example 1

20.2 grams of tri(ethylene glycol) divinyl ether is added dropwise into a three neck flask to a mixture of 240 grams of cyclic organopolysiloxanes having silicon-bonded hydrogen atoms (commercially available under the tradename MH1109 fluid from Dow Corning Corporation of Midland, Mich.) and 5 parts per million (ppm) of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the tri(ethylene glycol) divinyl ether to the flask, the contents of the flask are heated at 60° C. for one hour while stirring. The contents of the flask are cooled to room temperature, and 0.02 grams of diallyl maleate are disposed in the flask. The contents of the flask are stripped under vacuum at 60° C. for one hour to give the precursor compound in solution, which is a viscous liquid.

Initial Preparation Example 2

19.63 grams of 1,4-cyclohexanedimethanol divinyl ether is added dropwise into a three neck flask to a mixture of 240 grams of cyclic organopolysiloxanes having silicon-bonded hydrogen atoms (commercially available under the tradename MH1109 fluid from Dow Corning Corporation of Midland, Mich.) and 5 parts per million (ppm) of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the 1,4-cyclohexanedimethanol divinyl ether to the flask, the contents of the flask are heated at 60° C. for one hour while stirring. The contents of the flask are cooled to room temperature, and 0.02 grams of diallyl maleate are disposed in the flask. The contents of the flask are stripped under vacuum at 60° C. for one hour to give the precursor compound in solution, which is a viscous liquid.

Initial Preparation Example 3

11.02 grams of 1,7-octadiene is added dropwise into a three neck flask to a mixture of 240 grams of cyclic organopolysiloxanes having silicon-bonded hydrogen atoms (commercially available under the tradename MH1109 fluid from Dow Corning Corporation of Midland, Mich.) and 5 parts per million (ppm) of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the 1,7-octadiene to the flask, the contents of the flask are heated at 60° C. for one hour while stirring. The contents of the flask are cooled to room temperature, and 0.02 grams of diallyl maleate are disposed in the flask. The contents of the flask are stripped under vacuum at 60° C. for one hour to give the precursor compound in solution, which is a viscous liquid.

Initial Preparation Example 4

13.83 grams of 1,9-decadiene is added dropwise into a three neck flask to a mixture of 240 grams of cyclic organopolysiloxanes having silicon-bonded hydrogen atoms (commercially available under the tradename MH1109 fluid from Dow Corning Corporation of Midland, Mich.) and 5 parts per million (ppm) of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the 1,9-decadiene to the flask, the contents of the flask are heated at 60° C. for one hour while stirring. The contents of the flask are cooled to room temperature, and 0.02 grams of diallyl maleate are disposed in the flask. The contents of the flask are stripped under vacuum at 60° C. for one hour to give the precursor compound in solution, which is a viscous liquid.

Initial Preparation Example 5

34.24 grams of bis[4-(vinyloxy)butyl] adipate is added dropwise into a three neck flask to a mixture of 240 grams of cyclic organopolysiloxanes having silicon-bonded hydrogen atoms (commercially available under the tradename MH1109 fluid from Dow Corning Corporation of Midland, Mich.) and 5 parts per million (ppm) of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the bis[4-(vinyloxy)butyl] adipate to the flask, the contents of the flask are heated at 60° C. for one hour while stirring. The contents of the flask are cooled to room temperature, and 0.02 grams of diallyl maleate are disposed in the flask. The contents of the flask are stripped under vacuum at 60° C. for one hour to give the precursor compound in solution, which is a viscous liquid.

Initial Preparation Example 6

18.64 grams of tetramethyldivinylsiloxane is added dropwise into a three neck flask to a mixture of 240 grams of cyclic organopolysiloxanes having silicon-bonded hydrogen atoms (commercially available under the tradename MH1109 fluid from Dow Corning Corporation of Midland, Mich.) and 5 parts per million (ppm) of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the tetramethyldivinylsiloxane to the flask, the contents of the flask are heated at 60° C. for one hour while stirring. The contents of the flask are cooled to room temperature, and 0.02 grams of diallyl maleate are disposed in the flask. The contents of the flask are stripped under vacuum at 60° C. for one hour to give the precursor compound in solution, which is a viscous liquid.

Initial Preparation Example 7

77.8 grams of divinyl-terminated poly(dimethyl)siloxane (vinyl content of 3.46 wt. %) is added dropwise into a three neck flask to a mixture of 240 grams of cyclic organopolysiloxanes having silicon-bonded hydrogen atoms (commercially available under the tradename MH1109 fluid from Dow Corning Corporation of Midland, Mich.) and 5 parts per million (ppm) of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the divinyl-terminated poly(dimethyl)siloxane to the flask, the contents of the flask are heated at 60° C. for one hour while stirring. The contents of the flask are cooled to room temperature, and 0.02 grams of diallyl maleate are disposed in the flask. The contents of the flask are stripped under vacuum at 60° C. for one hour to give the precursor compound in solution, which is a viscous liquid.

Initial Preparation Example 8

24.63 grams of diallyl phthalate is added dropwise into a three neck flask to a mixture of 240 grams of cyclic organopolysiloxanes having silicon-bonded hydrogen atoms (commercially available under the tradename MH1109 fluid from Dow Corning Corporation of Midland, Mich.) and 5 parts per million (ppm) of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the diallyl phthalate to the flask, the contents of the flask are heated at 60° C. for one hour while stirring. The contents of the flask are cooled to room temperature, and 0.02 grams of diallyl maleate are disposed in the flask. The contents of the flask are stripped under vacuum at 60° C. for one hour to give the precursor compound in solution, which is a viscous liquid.

Initial Preparation Example 9

31.05 grams of 1,3-divinyl-1,3-diphenyl-1,3-dimethyldisiloxane is added dropwise into a three neck flask to a mixture of 240 grams of cyclic organopolysiloxanes having silicon-bonded hydrogen atoms (commercially available under the tradename MH1109 fluid from Dow Corning Corporation of Midland, Mich.) and 5 parts per million (ppm) of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the 1,3-divinyl-1,3-diphenyl-1,3-dimethyldisiloxane to the flask, the contents of the flask are heated at 60° C. for one hour while stirring. The contents of the flask are cooled to room temperature, and 0.02 grams of diallyl maleate are disposed in the flask. The contents of the flask are stripped under vacuum at 60° C. for one hour to give the precursor compound in solution, which is a viscous liquid.

Preparation Examples 1-14

Fluorinated compounds in accordance with the invention are prepared. In particular, fluorinated compounds are formed in Preparation Examples 1-9 with the precursor compounds prepared in Initial Preparation Examples 1-9, respectively. Fluorinated compounds are prepared in Preparation Examples 10-14 via an alternative method not involving the precursor compounds of the Initial Preparation Examples.

Preparation Example 1

16 grams of a polyfluoropolyether compound (commercially available under the tradename Krytox® allyl ether (weight-average molecular weight of about 3,200 g/mol) from E. I. du Pont de Nemours and Company of Wilmington, Del.) in 30 grams of 1,3-bistrifluoromethyl benzene is added dropwise into a three neck flask to a mixture of 3.42 grams of the precursor compound of Initial Preparation Example 1, 70 grams of 1,3-bistrifluoromethyl benzene, 0.02 grams of alkylacetoxysilane (1:1 molar blend of methyltriacetoxysilane and ethyltriacetoxysilane), and 10 ppm of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen (N$_2$). After the addition of the polyfluoropolyether compound in 1,3-bistrifluoromethyl to the flask, the contents of the flask are heated at 60° C. for one hour while stirring. After one hour, 6 grams of allyl methacrylate and 0.02 grams of butylated hydroxytoluene are disposed in the flask, and the contents of the flask are heated at 60° C. for another hour while stirring. The contents of the flask are cooled to room temperature, and 0.02 grams of diallyl maleate are disposed in the flask. A fluorinated compound in solution (20% solids) results.

Preparation Example 2

16 grams of a polyfluoropolyether compound (commercially available under the tradename Krytox® allyl ether (weight-average molecular weight of about 3,200 g/mol) from E. I. du Pont de Nemours and Company of Wilmington, Del.) in 30 grams of 1,3-bistrifluoromethyl benzene is added dropwise into a three neck flask to a mixture of 3.38 grams of the precursor compound of Initial Preparation Example 2, 70 grams of 1,3-bistrifluoromethyl benzene, 0.02 grams of alkylacetoxysilane (1:1 molar blend of methyltriacetoxysilane and ethyltriacetoxysilane), and 10 ppm of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen (N$_2$). After the addition of the polyfluoropolyether compound in 1,3-bistrifluoromethyl to the flask, the contents of the flask are heated at 60° C. for one hour while stirring. After one hour, 6 grams of allyl methacrylate and 0.02 grams of butylated hydroxytoluene are disposed in the flask, and the contents of the flask are heated at 60° C. for another hour while stirring. The contents of the flask are cooled to room temperature, and 0.02 grams of diallyl maleate are disposed in the flask. A fluorinated compound in solution (20% solids) results.

Preparation Example 3

16 grams of a polyfluoropolyether compound (commercially available under the tradename Krytox® allyl ether (weight-average molecular weight of about 3,200 g/mol) from E. I. du Pont de Nemours and Company of Wilmington, Del.) in 30 grams of 1,3-bistrifluoromethyl benzene is added dropwise into a three neck flask to a mixture of 2.95 grams of the precursor compound of Initial Preparation Example 3, 70 grams of 1,3-bistrifluoromethyl benzene, 0.02 grams of alkylacetoxysilane (1:1 molar blend of methyltriacetoxysilane and ethyltriacetoxysilane), and 10 ppm of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen (N$_2$). After the addition of the polyfluoropolyether compound in 1,3-bistrifluoromethyl to the flask, the contents of the flask are heated at 60° C. for one hour while stirring. After one hour, 6 grams of allyl methacrylate and 0.02 grams of butylated hydroxytoluene are disposed in the flask, and the contents of the flask are heated at 60° C. for another hour while stirring. The contents of the flask are cooled to room temperature, and 0.02 grams of diallyl maleate are disposed in the flask. A fluorinated compound in solution (20% solids) results.

Preparation Example 4

16 grams of a polyfluoropolyether compound (commercially available under the tradename Krytox® allyl ether (weight-average molecular weight of about 3,200 g/mol) from E. I. du Pont de Nemours and Company of Wilmington, Del.) in 30 grams of 1,3-bistrifluoromethyl benzene is added dropwise into a three neck flask to a mixture of 3.08 grams of the precursor compound of Initial Preparation Example 4, 70 grams of 1,3-bistrifluoromethyl benzene, 0.02 grams of alkylacetoxysilane (1:1 molar blend of methyltriacetoxysilane and ethyltriacetoxysilane), and 10 ppm of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen (N$_2$). After the addition of the polyfluoropolyether compound in 1,3-bistrifluoromethyl to the flask, the contents of the flask are heated at 60° C. for one hour while stirring. After one hour, 6 grams of allyl methacrylate and 0.02 grams of butylated hydroxytoluene are disposed in the flask, and the contents of the flask are heated at 60° C. for another hour while stirring. The contents of the flask are cooled to room temperature, and 0.02 grams of diallyl maleate are disposed in the flask. A fluorinated compound in solution (20% solids) results.

Preparation Example 5

16 grams of a polyfluoropolyether compound (commercially available under the tradename Krytox® allyl ether (weight-average molecular weight of about 3,200 g/mol) from E. I. du Pont de Nemours and Company of Wilmington, Del.) in 30 grams of 1,3-bistrifluoromethyl benzene is added dropwise into a three neck flask to a mixture of 4.11 grams of the precursor compound of Initial Preparation Example 5, 70 grams of 1,3-bistrifluoromethyl benzene, 0.02 grams of alkylacetoxysilane (1:1 molar blend of methyltriacetoxysilane and ethyltriacetoxysilane), and 10 ppm of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen (N$_2$). After the addition of the polyfluoropolyether compound in 1,3-bistrifluoromethyl to the flask, the contents of the flask are heated at 60° C. for one hour while stirring. After one hour, 6 grams of allyl methacrylate and 0.02 grams of butylated hydroxytoluene are disposed in the flask, and the contents of the flask are heated at 60° C. for another hour while stirring. The contents of the flask are cooled to room temperature, and 0.02 grams of diallyl maleate are disposed in the flask. A fluorinated compound in solution (20% solids) results.

Preparation Example 6

16 grams of a polyfluoropolyether compound (commercially available under the tradename Krytox® allyl ether (weight-average molecular weight of about 3,200 g/mol) from E. I. du Pont de Nemours and Company of Wilmington, Del.) in 30 grams of 1,3-bistrifluoromethyl benzene is added dropwise into a three neck flask to a mixture of 3.33 grams of the precursor compound of Initial Preparation Example 6, 70 grams of 1,3-bistrifluoromethyl benzene, 0.02 grams of alkylacetoxysilane (1:1 molar blend of methyltriacetoxysilane and ethyltriacetoxysilane), and 10 ppm of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen (N$_2$). After the addition of the polyfluoropolyether compound in 1,3-bistrifluoromethyl to the flask, the contents of the flask are heated at 60° C. for one hour while stirring. After one hour, 6 grams of allyl methacrylate and 0.02 grams of butylated hydroxytoluene are disposed in the flask, and the contents of the flask are heated at 60° C. for another hour while stirring. The contents of the flask are cooled to room temperature, and 0.02 grams of diallyl maleate are disposed in the flask. A fluorinated compound in solution (20% solids) results.

Preparation Example 7

16 grams of a polyfluoropolyether compound (commercially available under the tradename Krytox® allyl ether (weight-average molecular weight of about 3,200 g/mol) from E. I. du Pont de Nemours and Company of Wilmington, Del.) in 30 grams of 1,3-bistrifluoromethyl benzene is added dropwise into a three neck flask to a mixture of 6.29 grams of the precursor compound of Initial Preparation Example 7, 70 grams of 1,3-bistrifluoromethyl benzene, 0.02 grams of alkylacetoxysilane (1:1 molar blend of methyltriacetoxysilane and ethyltriacetoxysilane), and 10 ppm of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the polyfluoropolyether compound in 1,3-bistrifluoromethyl to the flask, the contents of the flask are heated at 60° C. for one hour while stirring. After one hour, 6 grams of allyl methacrylate and 0.02 grams of butylated hydroxytoluene are disposed in the flask, and the contents of the flask are heated at 60° C. for another hour while stirring. The contents of the flask are cooled to room temperature, and 0.02 grams of diallyl maleate are disposed in the flask. A fluorinated compound in solution (20% solids) results.

Preparation Example 8

16 grams of a polyfluoropolyether compound (commercially available under the tradename Krytox® allyl ether (weight-average molecular weight of about 3,200 g/mol) from E. I. du Pont de Nemours and Company of Wilmington, Del.) in 30 grams of 1,3-bistrifluoromethyl benzene is added dropwise into a three neck flask to a mixture of 3.63 grams of the precursor compound of Initial Preparation Example 8, 70 grams of 1,3-bistrifluoromethyl benzene, 0.02 grams of alkylacetoxysilane (1:1 molar blend of methyltriacetoxysilane and ethyltriacetoxysilane), and 10 ppm of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the polyfluoropolyether compound in 1,3-bistrifluoromethyl to the flask, the contents of the flask are heated at 60° C. for one hour while stirring. After one hour, 6 grams of allyl methacrylate and 0.02 grams of butylated hydroxytoluene are disposed in the flask, and the contents of the flask are heated at 60° C. for another hour while stirring. The contents of the flask are cooled to room temperature, and 0.02 grams of diallyl maleate are disposed in the flask. A fluorinated compound in solution (20% solids) results.

Preparation Example 9

16 grams of a polyfluoropolyether compound (commercially available under the tradename Krytox® allyl ether (weight-average molecular weight of about 3,200 g/mol) from E. I. du Pont de Nemours and Company of Wilmington, Del.) in 30 grams of 1,3-bistrifluoromethyl benzene is added dropwise into a three neck flask to a mixture of 3.95 grams of the precursor compound of Initial Preparation Example 9, 70 grams of 1,3-bistrifluoromethyl benzene, 0.02 grams of alkylacetoxysilane (1:1 molar blend of methyltriacetoxysilane and ethyltriacetoxysilane), and 10 ppm of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the polyfluoropolyether compound in 1,3-bistrifluoromethyl to the flask, the contents of the flask are heated at 60° C. for one hour while stirring. After one hour, 6 grams of allyl methacrylate and 0.02 grams of butylated hydroxytoluene are disposed in the flask, and the contents of the flask are heated at 60° C. for another hour while stirring. The contents of the flask are cooled to room temperature, and 0.02 grams of diallyl maleate are disposed in the flask. A fluorinated compound in solution (20% solids) results.

Preparation Example 10

16 grams of a polyfluoropolyether compound (commercially available under the tradename Krytox® allyl ether (weight-average molecular weight of about 3,200 g/mol) from E. I. du Pont de Nemours and Company of Wilmington, Del.) in 30 grams of 1,3-bistrifluoromethyl benzene is added dropwise into a three neck flask to a mixture of 3.21 grams of an organopolysiloxane having silicon-bonded hydrogen atoms (commercially available under the tradename 5-0210 fluid from Dow Corning Corporation of Midland, Mich.), 70 grams of 1,3-bistrifluoromethyl benzene, 0.02 grams of alkylacetoxysilane (1:1 molar blend of methyltriacetoxysilane and ethyltriacetoxysilane), and 10 ppm of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the polyfluoropolyether compound in 1,3-bistrifluoromethyl to the flask, the contents of the flask are heated at 60° C. for one hour while stirring. After one hour, 10.08 grams of allyl methacrylate and 0.02 grams of butylated hydroxytoluene are disposed in the flask, and the contents of the flask are heated at 60° C. for another hour while stirring. The contents of the flask are cooled to room temperature, and 0.02 grams of diallyl maleate are disposed in the flask. A fluorinated compound in solution (20% solids) results.

Preparation Example 11

16 grams of a polyfluoropolyether compound (commercially available under the tradename Krytox® allyl ether (weight-average molecular weight of about 3,200 g/mol) from E. I. du Pont de Nemours and Company of Wilmington, Del.) in 30 grams of 1,3-bistrifluoromethyl benzene is added dropwise into a three neck flask to a mixture of 5.14 grams of an organopolysiloxane having silicon-bonded hydrogen atoms (commercially available under the tradename 1-3502 polymer from Dow Corning Corporation of Midland, Mich.), 70 grams of 1,3-bistrifluoromethyl benzene, 0.02 grams of alkylacetoxysilane (1:1 molar blend of methyltriacetoxysilane and ethyltriacetoxysilane), and 10 ppm of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the polyfluoropolyether compound in 1,3-bistrifluoromethyl to the flask, the contents of the flask are heated at 60° C. for one hour while stirring. After one hour, 4.32 grams of allyl methacrylate and 0.02 grams of butylated hydroxytoluene are disposed in the flask, and the contents of the flask are heated at 60° C. for another hour while stirring. The contents of the flask are cooled to room temperature, and 0.02 grams of diallyl maleate are disposed in the flask. A fluorinated compound in solution (20% solids) results.

Preparation Example 12

16 grams of a polyfluoropolyether compound (commercially available under the tradename Krytox® allyl ether (weight-average molecular weight of about 3,200 g/mol) from E. I. du Pont de Nemours and Company of Wilmington, Del.) in 30 grams of 1,3-bistrifluoromethyl benzene is added dropwise into a three neck flask to a mixture of 7.47 grams of an organopolysiloxane having silicon-bonded hydrogen atoms (commercially available under the tradename 6-3570 polymer from Dow Corning Corporation of Midland, Mich.), 70 grams of 1,3-bistrifluoromethyl benzene, 0.02 grams of alkylacetoxysilane (1:1 molar blend of methyltriacetoxysilane and ethyltriacetoxysilane), and 10 ppm of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the polyfluoropolyether compound in 1,3-bistrifluoromethyl to the flask, the contents of the flask are heated at 60° C. for one hour while stirring. After one hour, 7.2 grams of allyl methacrylate and 0.02 grams of butylated hydroxytoluene are disposed in the flask, and the contents of the flask are heated at 60° C. for another hour while stirring. The contents of the flask are cooled to room temperature, and 0.02 grams of diallyl maleate are disposed in the flask. A fluorinated compound in solution (20% solids) results.

Preparation Example 13

16 grams of a polyfluoropolyether compound (commercially available under the tradename Krytox® allyl ether (weight-average molecular weight of about 3,200 g/mol) from E. I. du Pont de Nemours and Company of Wilmington, Del.) in 30 grams of 1,3-bistrifluoromethyl benzene is added dropwise into a three neck flask to a mixture of 7.5 grams of an organopolysiloxane (methylhydrogen-terminated polydimethylsiloxane having an SiH content of 0.4 wt %), 70 grams of 1,3-bistrifluoromethyl benzene, 0.02 grams of alkylacetoxysilane (1:1 molar blend of methyltriacetoxysilane and ethyltriacetoxysilane), and 10 ppm of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the polyfluoropolyether compound in 1,3-bistrifluoromethyl to the flask, the contents of the flask are heated at 60° C. for one hour while stirring. After one hour, 7.2 grams of allyl methacrylate and 0.02 grams of butylated hydroxytoluene are disposed in the flask, and the contents of the flask are heated at 60° C. for another hour while stirring. The contents of the flask are cooled to room temperature, and 0.02 grams of diallyl maleate are disposed in the flask. A fluorinated compound in solution (20% solids) results.

Preparation Example 14

16 grams of a polyfluoropolyether compound (commercially available under the tradename Krytox® allyl ether (weight-average molecular weight of about 3,200 g/mol) from E. I. du Pont de Nemours and Company of Wilmington, Del.) in 30 grams of 1,3-bistrifluoromethyl benzene is added dropwise into a three neck flask to a mixture of 7.5 grams of cyclic organopolysiloxanes having silicon-bonded hydrogen atoms (commercially available under the tradename MH1109 fluid from Dow Corning Corporation of Midland, Mich.), 70 grams of 1,3-bistrifluoromethyl benzene, 0.02 grams of alkylacetoxysilane (1:1 molar blend of methyltriacetoxysilane and ethyltriacetoxysilane), and 10 ppm of a hydrosilylation catalyst (1,3-diethenyl-1,1,3,3-tetramethyldisiloxane complexes (Pt) in tetramethyldivinyldisiloxane; 27 wt % of Pt), at 60° C. under nitrogen ($N_2$). After the addition of the polyfluoropolyether compound in 1,3-bistrifluoromethyl to the flask, the contents of the flask are heated at 60° C. for one hour while stirring. After one hour, 6 grams of allyl methacrylate and 0.02 grams of butylated hydroxytoluene are disposed in the flask, and the contents of the flask are heated at 60° C. for another hour while stirring. The contents of the flask are cooled to room temperature, and 0.02 grams of diallyl maleate are disposed in the flask. A fluorinated compound in solution (20% solids) results.

Examples 1-14 and Comparative Example 1

The fluorinated compounds prepared in Preparation Examples 1-14 are utilized to prepare curable compositions (and ultimately cured products) in Examples 1-14 below. A comparative curable composition is illustrated in Comparative Example 1.

The following components are utilized in the curable compositions of Examples 1-14 and Comparative Example 1:

Polyfunctional Acrylate comprises a blend of dipentaerythritol hexaacrylate and dipentaerythritol pentaacrylate (1:1 molar ratio), commercially available under the tradename Kayarad dPHA from Nippon Kayaku Co., Ltd. of Tokyo, Japan;

Reinforcing Filler comprises a colloidal silica monodispersed in isopropanol (30 wt. % $SiO_2$), commercially available under the tradename ORGANOSILICASOL™ MEK-ST from Nissan Chemical America Corporation of Houston, Tex.

Photopolymerization Initiator comprises 1-hydroxycyclohexyl phenyl ketone, commercially available under the tradename Irgacure® 184 from BASF Corporation of Florham Park, N.J.

Filler Treating Agent comprises 3-methacryloxypropyl trimethoxysilane.

Example 1

16.3 grams of 2-butanone, 21.3 grams of the Polyfunctional Acrylate, and 0.49 grams of an aminopropyl-terminated poly(dimethyl)siloxane (viscosity at 25° C. of 20-30 centiStokes (cSt)) are disposed in a dry three neck flask and heated at 50° C. while stirring for 1 hour. 5.3 grams of the Filler Treating Agent, 53.3 grams of the Reinforcing Filler, and 0.46 grams of deionized water are disposed in the flask while heating at 50° C. while stirring for another hour. After cooling to room temperature, 2.0 grams of fluorinated compound of Preparation Example 1 and 2.0 grams of the Photopolymerization Initiator are disposed in the flask to give the curable composition.

Example 2

16.3 grams of 2-butanone, 21.3 grams of the Polyfunctional Acrylate, and 0.49 grams of an aminopropyl-terminated poly(dimethyl)siloxane (viscosity at 25° C. of 20-30 centiStokes (cSt)) are disposed in a dry three neck flask and heated at 50° C. while stirring for 1 hour. 5.3 grams of the Filler Treating Agent, 53.3 grams of the Reinforcing Filler, and 0.46 grams of deionized water are disposed in the flask while heating at 50° C. while stirring for another hour. After cooling to room temperature, 2.0 grams of fluorinated compound of Preparation Example 2 and 2.0 grams of the Photopolymerization Initiator are disposed in the flask to give the curable composition.

Example 3

16.3 grams of 2-butanone, 21.3 grams of the Polyfunctional Acrylate, and 0.49 grams of an aminopropyl-terminated poly(dimethyl)siloxane (viscosity at 25° C. of 20-30 centiStokes (cSt)) are disposed in a dry three neck flask and heated at 50° C. while stirring for 1 hour. 5.3 grams of the Filler Treating Agent, 53.3 grams of the Reinforcing Filler, and 0.46 grams of deionized water are disposed in the flask while heating at 50° C. while stirring for another hour. After cooling to room temperature, 2.0 grams of fluorinated compound of Preparation Example 3 and 2.0 grams of the Photopolymerization Initiator are disposed in the flask to give the curable composition.

Example 4

16.3 grams of 2-butanone, 21.3 grams of the Polyfunctional Acrylate, and 0.49 grams of an aminopropyl-terminated poly(dimethyl)siloxane (viscosity at 25° C. of 20-30 centiStokes (cSt)) are disposed in a dry three neck flask and heated at 50° C. while stirring for 1 hour. 5.3 grams of the Filler Treating Agent, 53.3 grams of the Reinforcing Filler, and 0.46 grams of deionized water are disposed in the flask while heating at 50° C. while stirring for another hour. After cooling to room temperature, 2.0 grams of fluorinated compound of Preparation Example 4 and 2.0 grams of the Photopolymerization Initiator are disposed in the flask to give the curable composition.

Example 5

16.3 grams of 2-butanone, 21.3 grams of the Polyfunctional Acrylate, and 0.49 grams of an aminopropyl-terminated poly(dimethyl)siloxane (viscosity at 25° C. of 20-30 centiStokes (cSt)) are disposed in a dry three neck flask and heated at 50° C. while stirring for 1 hour. 5.3 grams of the Filler Treating Agent, 53.3 grams of the Reinforcing Filler, and 0.46 grams of deionized water are disposed in the flask while heating at 50° C. while stirring for another hour. After cooling to room temperature, 2.0 grams of fluorinated compound of Preparation Example 5 and 2.0 grams of the Photopolymerization Initiator are disposed in the flask to give the curable composition.

Example 6

16.3 grams of 2-butanone, 21.3 grams of the Polyfunctional Acrylate, and 0.49 grams of an aminopropyl-terminated poly(dimethyl)siloxane (viscosity at 25° C. of 20-30 centiStokes (cSt)) are disposed in a dry three neck flask and heated at 50° C. while stirring for 1 hour. 5.3 grams of the Filler Treating Agent, 53.3 grams of the Reinforcing Filler, and 0.46 grams of deionized water are disposed in the flask while heating at 50° C. while stirring for another hour. After cooling to room temperature, 2.0 grams of fluorinated compound of Preparation Example 6 and 2.0 grams of the Photopolymerization Initiator are disposed in the flask to give the curable composition.

Example 7

16.3 grams of 2-butanone, 21.3 grams of the Polyfunctional Acrylate, and 0.49 grams of an aminopropyl-terminated poly(dimethyl)siloxane (viscosity at 25° C. of 20-30 centiStokes (cSt)) are disposed in a dry three neck flask and heated at 50° C. while stirring for 1 hour. 5.3 grams of the Filler Treating Agent, 53.3 grams of the Reinforcing Filler, and 0.46 grams of deionized water are disposed in the flask while heating at 50° C. while stirring for another hour. After cooling to room temperature, 2.0 grams of fluorinated compound of Preparation Example 7 and 2.0 grams of the Photopolymerization Initiator are disposed in the flask to give the curable composition.

Example 8

16.3 grams of 2-butanone, 21.3 grams of the Polyfunctional Acrylate, and 0.49 grams of an aminopropyl-terminated poly(dimethyl)siloxane (viscosity at 25° C. of 20-30 centiStokes (cSt)) are disposed in a dry three neck flask and heated at 50° C. while stirring for 1 hour. 5.3 grams of the Filler Treating Agent, 53.3 grams of the Reinforcing Filler, and 0.46 grams of deionized water are disposed in the flask while heating at 50° C. while stirring for another hour. After cooling to room temperature, 2.0 grams of fluorinated compound of Preparation Example 8 and 2.0 grams of the Photopolymerization Initiator are disposed in the flask to give the curable composition.

Example 9

16.3 grams of 2-butanone, 21.3 grams of the Polyfunctional Acrylate, and 0.49 grams of an aminopropyl-terminated poly(dimethyl)siloxane (viscosity at 25° C. of 20-30 centiStokes (cSt)) are disposed in a dry three neck flask and heated at 50° C. while stirring for 1 hour. 5.3 grams of the Filler Treating Agent, 53.3 grams of the Reinforcing Filler, and 0.46 grams of deionized water are disposed in the flask while heating at 50° C. while stirring for another hour. After cooling to room temperature, 2.0 grams of fluorinated compound of Preparation Example 9 and 2.0 grams of the Photopolymerization Initiator are disposed in the flask to give the curable composition.

Example 10

16.3 grams of 2-butanone, 21.3 grams of the Polyfunctional Acrylate, and 0.49 grams of an aminopropyl-terminated poly(dimethyl)siloxane (viscosity at 25° C. of 20-30 centiStokes (cSt)) are disposed in a dry three neck flask and heated at 50° C. while stirring for 1 hour. 5.3 grams of the Filler Treating Agent, 53.3 grams of the Reinforcing Filler, and 0.46 grams of deionized water are disposed in the flask while heating at 50° C. while stirring for another hour. After cooling to room temperature, 2.0 grams of fluorinated compound of Preparation Example 10 and 2.0 grams of the Photopolymerization Initiator are disposed in the flask to give the curable composition.

Example 11

16.3 grams of 2-butanone, 21.3 grams of the Polyfunctional Acrylate, and 0.49 grams of an aminopropyl-terminated poly(dimethyl)siloxane (viscosity at 25° C. of 20-30 centiStokes (cSt)) are disposed in a dry three neck flask and heated at 50° C. while stirring for 1 hour. 5.3 grams of the Filler Treating Agent, 53.3 grams of the Reinforcing Filler, and 0.46 grams of deionized water are disposed in the flask while heating at 50° C. while stirring for another hour. After cooling to room temperature, 2.0 grams of fluorinated compound of Preparation Example 11 and 2.0 grams of the Photopolymerization Initiator are disposed in the flask to give the curable composition.

Example 12

16.3 grams of 2-butanone, 21.3 grams of the Polyfunctional Acrylate, and 0.49 grams of an aminopropyl-terminated poly(dimethyl)siloxane (viscosity at 25° C. of 20-30 centiStokes (cSt)) are disposed in a dry three neck flask and heated at 50° C. while stirring for 1 hour. 5.3 grams of the Filler Treating Agent, 53.3 grams of the Reinforcing Filler, and 0.46 grams of deionized water are disposed in the flask while heating at 50° C. while stirring for another hour. After cooling to room temperature, 2.0 grams of fluorinated compound of Preparation Example 12 and 2.0 grams of the Photopolymerization Initiator are disposed in the flask to give the curable composition.

Example 13

16.3 grams of 2-butanone, 21.3 grams of the Polyfunctional Acrylate, and 0.49 grams of an aminopropyl-terminated poly(dimethyl)siloxane (viscosity at 25° C. of 20-30 centiStokes (cSt)) are disposed in a dry three neck flask and heated at 50° C. while stirring for 1 hour. 5.3 grams of the Filler Treating Agent, 53.3 grams of the Reinforcing Filler, and 0.46 grams of deionized water are disposed in the flask while heating at 50° C. while stirring for another hour. After cooling to room temperature, 2.0 grams of fluorinated compound of Preparation Example 13 and 2.0 grams of the Photopolymerization Initiator are disposed in the flask to give the curable composition.

Example 14

16.3 grams of 2-butanone, 21.3 grams of the Polyfunctional Acrylate, and 0.49 grams of an aminopropyl-terminated poly(dimethyl)siloxane (viscosity at 25° C. of 20-30 centiStokes (cSt)) are disposed in a dry three neck flask and heated at 50° C. while stirring for 1 hour. 5.3 grams of the Filler Treating Agent, 53.3 grams of the Reinforcing Filler, and 0.46 grams of deionized water are disposed in the flask while heating at 50° C. while stirring for another hour. After cooling to room temperature, 2.0 grams of fluorinated compound of Preparation Example 14 and 2.0 grams of the Photopolymerization Initiator are disposed in the flask to give the curable composition.

Comparative Example 1

16.3 grams of 2-butanone, 21.3 grams of the Polyfunctional Acrylate, 5.3 grams of the Filler Treating Agent, 53.3 grams of the Reinforcing Filler, and 0.46 grams of deionized water are disposed in a dry three neck flask and heated at 50° C. while stirring for 1 hour. After cooling to room temperature, 2.0 grams of the Photopolymerization Initiator are disposed in the flask to give the curable composition.

Cured Products:

The curable compositions of Examples 1-14 and Comparative Example 1 are filtered via a syringe filter (polytetrafluoroethylene with glass microfiber; 30 millimeter (mm) diameter; 0.45 micrometer (μm) pore size; commercially available under the tradename Whatman® from GE Healthcare of Little Chalfront, U.K.). Samples of the curable compositions of Examples 1-14 and Comparative Example 1 are applied to polycarbonate substrate. Specifically, the samples of the curable compositions are applied to the polycarbonate substrates via spin coating with a spin-coater (commercially available from SÜSS MicroTec of Sunnvale, Calif.) at 200 rotations per minute (rpm) for 20 seconds and then 1,000 rpm for 30 seconds to provide wet films on the polycarbonate substrates. The wet films are dried for 10 minutes at 70° C. and cured via UV irradiation at a dosage of 2 J/cm$^2$ for a period of time sufficient to cure the wet films and give cured products. The cured products are in the form of thin films disposed on the polycarbonate substrates.

Physical properties of the cured products formed from the curable compositions of Examples 1-14 and Comparative Example 1 are measured as described below.

Contact Angle:

The static contact angles of water and hexadecane on each of the cured products are evaluated. Specifically, the static contact angles of water and hexadecane are measured via a VCA Optima XE goniometer, which is commercially available from AST Products, Inc., Billerica, Mass. The water contact angle measured is a static contact angle based on a 2 μL droplet on each of the cured products. The contact angle of water is referred to as WCA (water contact angle), and the contact angle of hexadecane is referred to as HCA (hexadecane contact angle). The WCA and HCA values are degrees (°).

Pencil Hardness:

The pencil hardness of each of the cured products is measured in accordance with ASTM D3363-04(2011)32, entitled "Standard Test Method for Film Hardness by Pencil Test." Pencil hardness values are generally based on graphite grading scales, which range from 9H (hardest value) to 9B (softest value).

Cross Hatch Adhesion Test:

The cross hatch adhesion test is performed in accordance with ASTM D 3002, entitled "Evaluation of Coatings Applied to Plastics" and ASTM D 3359-09e2, entitled "Standard Test Methods for Measuring Adhesion by Tape Test" utilizes right angle cuts (which are cross-hatched) in the cured products to the underlying substrates. The cracking of cutting edges and loss of adhesion is inspected based on the ASTM standard below:

ASTM class 5B: The cutting edges are completely smooth and none of the squares in the lattice formed from the cross hatch test are detached from the underlying substrate;

ASTM class 4B: Detachment of small flakes of the cured products at intersecting cuts; a cross cut area not significantly greater than 5% by area is affected;

ASTM Class 3B: The cured product has flaked along the cutting edges and at intersecting cuts; a cross cut area significantly greater than 5%, but not significantly greater than 15%, by area is affected;

ASTM class 2B: The cured product has flaked along the cutting edges partly or wholly in large ribbons, and/or has flaked partly or wholly on different squares in the lattice formed from the cross hatch test; a cross cut area significantly greater than 15%, but not significantly greater than 35%, by area is affected;

ASTM class 1B: The cured product has flaked along the cutting edges in large ribbons and/or some squares in the lattice formed from the cross hatch test have detached partly or wholly from the underlying substrate; a cross cut area significantly greater than 35%, but not significantly greater than 65%, by area is affected;

ASTM Class 0B: Any degree of flaking that cannot be classified as ASTM class 1B-5B.

Anti-Abrasion Test:

The anti-abrasion test utilizes a reciprocating abraser—Model 5900, which is commercially available from Taber Industries of North Tonawanda, N.Y. The abrading material utilized is a CS-17 Wearaser® from Taber Industries. The abrading material has dimensions of 6.5 mm×12.2 mm. The reciprocating abraser is operated for 10, 25, and 100 cycles at a speed of 25 cycles per minute with a stroke length of 1 inch and a load of 10.0 N. Following each of the cycles, the surfaces of the cured products are visually inspected to determine abrasion. The following ratings are assigned based on this optical inspection:

Rating 1: no damage to the cured product;

Rating 2: minor scratches to the cured product;

Rating 3: moderate scratches to the cured product;

Rating 4: substrate is partially visible through the cured product; and

Rating 5: substrate is fully visible through the cured product.

Stain Marker Test:

The stain marker tests measures optically the ability of the cured products to exhibit stain resistance. In particular, in the stain marker test, a line is drawn on each of the cured products with a Super Sharpie® permanent marker (commercially available from Newell Rubbermaid Office Products of Oak Brook, Ill.). The lines are inspected optically to determine whether the lines beaded on the cured products. A "1" ranking indicates that the line fully beads into a small droplet, whereas a "5" ranking indicates that the line does not bead whatsoever. Thirty seconds after drawing each line on the cured products, the line is wiped with a piece of paper (Kimtech Science™ Kimwipes™, commercially available from Kimberly-Clark Worldwide, Inc. of Irving, Tex.) five consecutive times. A "1" ranking indicates that the line (or beaded portion thereof) is fully removed from the substrate, whereas a "5" ranking indicates that the line is not removed whatsoever.

Table 1 below illustrates the physical properties of each of the cured products based on the tests described above. In Table 1, "Ex." designates Example; and "C.E." designates Comparative Example.

TABLE 1

| | Pencil Hardness | Cross Hatch Adhesion | Staining | | Contact Angle | | Abrasion | | |
|---|---|---|---|---|---|---|---|---|---|
| | | | Initial | Wiped | WCA (°) | HCA (°) | 10 cycles | 25 cycles | 100 cycles |
| Ex. 1 | 1H | 5B | 1 | 0 | 112.6 | 67.8 | 1 | 2 | 3 |
| Ex. 2 | 1H | 5B | 1 | 0 | 114.2 | 65.2 | 1 | 2 | 3 |
| Ex. 3 | 1H | 5B | 1 | 0 | 112.8 | 64.8 | 1 | 2 | 3 |
| Ex. 4 | 1H | 5B | 1 | 0 | 114.7 | 66.1 | 1 | 2 | 3 |
| Ex. 5 | 1H | 5B | 1 | 0 | 113.6 | 65.6 | 1 | 2 | 3 |
| Ex. 6 | 1H | 5B | 1 | 0 | 113.7 | 64.5 | 1 | 2 | 3 |
| Ex. 7 | 1H | 5B | 1 | 0 | 110.6 | 63.3 | 1 | 2 | 3 |
| Ex. 8 | 1H | 5B | 1 | 0 | 112.5 | 66.4 | 1 | 2 | 3 |
| Ex. 9 | 1H | 5B | 1 | 0 | 112.1 | 67.4 | 1 | 2 | 3 |
| Ex. 10 | 1H | 5B | 1 | 0 | 115.1 | 65.0 | 1 | 2 | 3 |
| Ex. 11 | 1H | 5B | 1 | 0 | 102.0 | 51.0 | 1 | 2 | 3 |
| Ex. 12 | 1H | 5B | 1 | 0 | 105.0 | 51.0 | 1 | 2 | 3 |
| Ex. 13 | 1H | 5B | 1 | 0 | 105.0 | 53.0 | 1 | 2 | 3 |
| Ex. 14 | 1H | 5B | 1 | 0 | 114.0 | 66.4 | 1 | 2 | 3 |
| C. E. 1 | 1H | 5B | 5 | 5 | 84.1 | 28.4 | 1 | 2 | 3 |

As clearly illustrated in Table 1 above, the physical properties of the cured products formed via the inventive curable compositions of Examples 1-14, which include the fluorinated compound, are superior to those of the cured product formed from the curable composition of Comparative Example 1, which does not include the fluorinated compound. Specifically, the cured products formed via the inventive curable compositions of Examples 1-14 have significantly increased contact angles and stain resistance as compared to the cured product formed from the curable composition of Comparative Example 1.

The invention has been described in an illustrative manner, and the terminology which has been used is intended to be in the nature of words of description rather than of limitation. Obviously, many modifications and variations of the invention are possible in light of the above teachings. The invention may be practiced otherwise than as specifically described.

What is claimed is:

1. A fluorinated compound having the general formula (5):

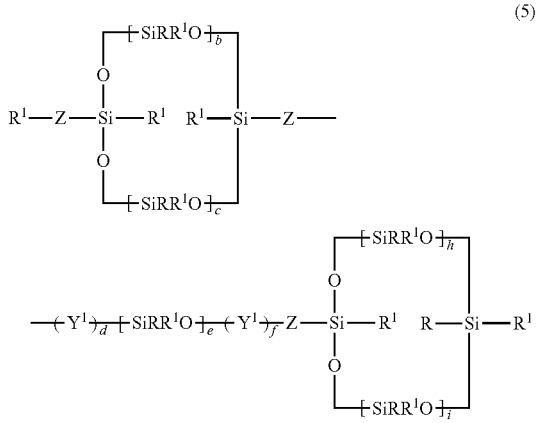

wherein each R is an independently selected substituted or unsubstituted hydrocarbyl group; each $R^1$ is independently selected from R, —Y—$R_f$, and a (meth)acrylate functional group; $R_f$ is a fluoro-substituted group; Y is a covalent bond or a bivalent linking group; each $Y^1$ is independently a covalent bond or a bivalent linking group;

Z is a covalent bond; subscripts b and c are each 0 or an integer from 1 to 10, with the proviso that at least one of b and c is at least 1; subscripts d and f are each independently 0 or 1; subscript e is 0 or an integer from 1 to 10; subscripts h and i are each 0 or an integer from 1 to 10, with the proviso that at least one of h and i is at least 1;

wherein at least one $R^1$ of said fluorinated compound is a (meth)acrylate functional group and at least one $R^1$ of said fluorinated compound is represented by —Y—$R_f$.

2. The fluorinated compound of claim 1 wherein each $Y^1$ is independently said bivalent linking group, said bivalent linking group being independently selected from the group of a hydrocarbylene group, a heterohydrocarbylene group, or an organoheterylene group.

3. The fluorinated compound of claim 1 wherein $R_f$: (i) is partially fluorinated; (ii) comprises a perfluoropolyether segment; or (iii) both (i) and (ii).

4. The fluorinated compound of claim 3 wherein $R_f$ comprises said perfluoropolyether segment, said perfluoropolyether segment comprising moieties of general formula (7):

$$—(C_3F_6O)_x—(C_2F_4O)_y—(CF_2)_z— \quad (7);$$

wherein subscripts x, y, and z are each independently selected from 0 and an integer from 1 to 40, with the proviso that x, y, and z are not simultaneously 0.

5. The fluorinated compound of claim 1 wherein Y is said bivalent linking group, said bivalent group represented by Y having the general formula (8):

$$—(CH_2)_m—O—(CH_2)_n— \quad (8);$$

wherein m and n are each integers independently from 1 to 5.

6. The fluorinated compound of claim 1 comprising two or more (meth)acrylate functional groups represented by $R^1$.

7. The fluorinated compound of claim 1 wherein one $R^1$ is represented by —Y—$R_f$.

8. A curable composition, comprising:
said fluorinated compound of claim 1; and
a polyfunctional acrylate.

9. The curable composition of claim 8 further comprising:
a fluoro-substituted compound different from the fluorinated compound and having an aliphatic unsaturated bond; and
a reinforcing filler.

10. A cured product formed by curing the curable composition of claim 9.

11. A cured product formed by curing the curable composition of claim 8.

12. An article comprising the cured product of claim 11 and a substrate, the cured product being disposed on the substrate.

13. The article of claim 12, the article comprising an electronic article, an optical article, consumer appliance or a component thereof, an automotive body or a component thereof, or a polymeric article; or the article comprising a sensor.

* * * * *